United States Patent
Chosogabe

(10) Patent No.: US 8,444,484 B2
(45) Date of Patent: May 21, 2013

(54) GAME DEVICE, CONTROL METHOD OF GAME DEVICE, AND INFORMATION STORAGE MEDIUM

(75) Inventor: Akiyoshi Chosogabe, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 673 days.

(21) Appl. No.: 12/531,368

(22) PCT Filed: Nov. 1, 2007

(86) PCT No.: PCT/JP2007/071325
§ 371 (c)(1),
(2), (4) Date: Sep. 15, 2009

(87) PCT Pub. No.: WO2008/114472
PCT Pub. Date: Sep. 25, 2008

(65) Prior Publication Data
US 2010/0099470 A1    Apr. 22, 2010

(30) Foreign Application Priority Data
Mar. 16, 2007    (JP) .................................. 2007-069578

(51) Int. Cl.
*A63F 9/24* (2006.01)
*A63F 13/00* (2006.01)

(52) U.S. Cl.
USPC .................................... 463/30; 463/1; 463/43

(58) Field of Classification Search
None
See application file for complete search history.

(56) References Cited

U.S. PATENT DOCUMENTS

| 6,346,943 | B1 | 2/2002 | Thoemmes et al. | |
|---|---|---|---|---|
| 7,771,279 | B2 * | 8/2010 | Miyamoto et al. | 463/31 |
| 2003/0144045 | A1 * | 7/2003 | Fujita | 463/1 |
| 2004/0180709 | A1 * | 9/2004 | Takahashi et al. | 463/3 |
| 2004/0209684 | A1 * | 10/2004 | Hisano | 463/32 |
| 2005/0176502 | A1 * | 8/2005 | Nishimura et al. | 463/31 |
| 2006/0267955 | A1 * | 11/2006 | Hino | 345/173 |
| 2007/0026944 | A1 * | 2/2007 | Maehiro et al. | 463/31 |
| 2007/0198178 | A1 * | 8/2007 | Trimby et al. | 701/209 |

FOREIGN PATENT DOCUMENTS

GB    2 365 362 A    2/2002

(Continued)

OTHER PUBLICATIONS

European Search Report corresponding to European Patent Application No. 07831059.6, dated Mar. 11, 2010.

(Continued)

*Primary Examiner* — David L Lewis
*Assistant Examiner* — Shauna-Kay Hall
(74) *Attorney, Agent, or Firm* — Sughrue Mion, PLLC

(57) ABSTRACT

A game device (10) capable of allowing a user to recognize a movement target position candidate for a mobile character at a glance. The game device (10) displays a game screen showing the mobile character moving toward a position designated by the user. A line acquisition unit (76) acquires a line connecting a position of the mobile character and the position designated by the user. A display control unit (78) displays at least a part of the line acquired by the line acquisition unit (76). The line acquisition unit (76) controls a curved manner of the line connecting the position of the mobile character and the position designated by the user based on a positional relationship between the position designated by the user and a movement target position candidate decided by a movement target position candidate decision unit (74).

24 Claims, 15 Drawing Sheets

FOREIGN PATENT DOCUMENTS

| | | |
|---|---|---|
| JP | 3262677 B2 | 11/1995 |
| JP | 2001-353370 A | 12/2001 |
| JP | 2002-200335 A | 7/2002 |
| JP | 2003-123089 A | 4/2003 |
| JP | 2004-290657 A | 10/2004 |
| JP | 2004-321599 A | 11/2004 |
| JP | 2005-040434 A | 2/2005 |
| JP | 2005-218778 A | 8/2005 |
| JP | 2006-271903 A | 10/2006 |
| JP | 2007-061271 A | 3/2007 |

OTHER PUBLICATIONS

Steve Keen, Arcade Pool, Cu Amiga Game Review, Jun. 1994, p. 78, XP002568202.

Arcade Pool (ECS/AGA), 1994 Team 17, XP-002568278, URL:http://www.lemonamiga.com/games/docs_print.php?id=92, p. 1.

*Aiming Aid, Target Candidate, Curved Trajectory*, 2010, URL:http://www.lemonamiga.com/games/popup_screen_index.php?id=1538&screenname=arcade_pool_05.png&kuk=05, pp. 2-4.

Korean Office Action corresponding to Korean Patent Application No. 10-2009-7009020, dated Mar. 30, 2011.

International Preliminary Report on Patentability dated Oct. 8, 2009 corresponding to PCT/JP 2007/071325.

*Aiming Aid, Target Candidate, Curved Trajectory*, 2010, URL:http://www.lemonanniga.com/games/popup_screen_index.php?id=1538&screenname=arcade_pool_05.png&kuk=05, pp. 2-4.

International Search Report of PCT/JP2007/071325 dated Jan. 8, 2008.

Japanese Office Action corresponding to Japanese Patent Application No. 2007-069578, dated Jun. 21, 2011.

* cited by examiner

GAME DEVICE, CONTROL METHOD OF GAME DEVICE, AND INFORMATION STORAGE MEDIUM

TECHNICAL FIELD

The present invention relates to a game device, a control method for a game device, and an information storage medium.

BACKGROUND ART

There is known a game device in which a screen coordinate value (coordinate value in a screen coordinate system) according to a user's operation is acquired to advance a game based on the screen coordinate value. For example, there is a game device in which a game is advanced based on a screen coordinate value input by using a mouse, a touch panel, or a pointing device such as an information input device disclosed in Patent Document 1.
Patent Document 1: JP3262677B

DISCLOSURE OF THE INVENTION

Problems to be Solved by the Invention

On such a game device, it is possible to realize, for example, such a game as to allow a user to designate a movement target position of a mobile character by using the above-mentioned pointing device to point to a position within a game screen. Specifically, it is possible to realize such a soccer game as to allow the user to designate a movement target position for a player character by using the above-mentioned pointing device to point at a position within a game screen.

There is an idea of providing such a game as described above with a function of guiding a user to a recommended movement target position (movement target position candidate) in order to improve the user's operability and to render the game more entertaining. For example, there is an idea of providing such a soccer game as described above with a function of guiding a user to a position within a region (free space) around which no other player character is located as the recommended movement target position. In a case of realizing such a guidance function, in order to improve its usability, it is necessary to allow the user to recognize the recommended movement target position at a glance.

The present invention has been made in view of the above-mentioned problem, and an object thereof is to provide a game device, a control method for a game device, and an information storage medium, which are capable of allowing a user to recognize a movement target position candidate for a mobile character at a glance.

Means for Solving the Problems

In order to solve the above-mentioned problem, according to the present invention, a game device, which displays a game screen showing a mobile character moving toward a position designated by a user, includes: designation position acquisition means for acquiring the position designated by the user; movement target position candidate decision means for deciding a movement target position candidate for the mobile character; line acquisition means for acquiring a line connecting a position of the mobile character and the position acquired by the designation position acquisition means; and display control means for displaying at least a part of the line acquired by the line acquisition means on the game screen, and the line acquisition means controls a curved manner of the line connecting the position of the mobile character and the position acquired by the designation position acquisition means based on a positional relationship between the position acquired by the designation position acquisition means and the movement target position candidate decided by the movement target position candidate decision means.

According to the present invention, a control method for a game device, which displays a game screen showing a mobile character moving toward a position designated by a user, includes: a designation position acquisition step of acquiring the position designated by the user; a movement target position candidate decision step of deciding a movement target position candidate for the mobile character; a line acquisition step of acquiring a line connecting a position of the mobile character and the position acquired in the designation position acquisition step; and a display control step of displaying at least a part of the line acquired in the line acquisition step on the game screen, and the line acquisition step includes controlling a curved manner of the line connecting the position of the mobile character and the position acquired in the designation position acquisition step based on a positional relationship between the position acquired in the designation position acquisition step and the movement target position candidate decided by the movement target position candidate decision step.

A program according to the present invention causes a computer such as a home-use game device, a portable game device, a business-use game device, a mobile phone, a personal digital assistant (PDA), or a personal computer to function as a game device which displays a game screen showing a mobile character moving toward a position designated by a user, the program causing the computer to function as: designation position acquisition means for acquiring the position designated by the user; movement target position candidate decision means for deciding a movement target position candidate for the mobile character; line acquisition means for acquiring a line connecting a position of the mobile character and the position acquired by the designation position acquisition means; and display control means for displaying at least a part of the line acquired by the line acquisition means on the game screen, and the line acquisition means controls a curved manner of the line connecting the position of the mobile character and the position acquired by the designation position acquisition means based on a positional relationship between the position acquired by the designation position acquisition means and the movement target position candidate decided by the movement target position candidate decision means.

Further, an information storage medium according to the present invention is a computer-readable information storage medium recorded with the above-mentioned program. Further, a program delivery device according to the present invention is a program delivery device including an information storage medium recorded with the above-mentioned program, for reading the above-mentioned program from the information storage medium and delivering the program. Further, a program delivery method according to the present invention is a program delivery method of reading the above-mentioned program from an information storage medium recorded with the above-mentioned program and delivering the program.

The present invention relates to the game device which displays the game screen showing the mobile character moving toward the position designated by the user. In the present invention, the position designated by the user is acquired. In addition, the movement target position candidate for the mobile character is decided. Then, the line connecting the position of the mobile character and the position designated by the user is acquired, and at least a part of the line is displayed on the game screen. Particularly, in the present invention, the curved manner of the above-mentioned line connecting the position of the mobile character and the position designated by the user is controlled based on the positional relationship between the position designated by the user and the movement target position candidate for the mobile character. According to the present invention, it becomes possible for the user to recognize the movement target position candidate for the mobile character at a glance.

According to an aspect of the present invention, the movement target position candidate decision means may decide the movement target position candidate so that an angle between a direction from the position of the mobile character toward the position acquired by the designation position acquisition means and a direction from the position acquired by the designation position acquisition means toward the movement target position candidate is equal to or less than a reference angle.

According to the above-mentioned aspect, the movement target position candidate decision means may include means for setting the reference angle based on a distance between the position of the mobile character and the position acquired by the designation position acquisition means.

According to an aspect of the present invention, a state of a game space in which the mobile character and a rival character competing against the mobile character are located may be displayed on the game screen. The display control means may include means for controlling a display style of the line acquired by the line acquisition means based on the movement target position candidate decided by the movement target position candidate decision means and a position of the rival character.

According to an aspect of the present invention, the display control means may include: means for storing a distance range and display style information related to the display style of the line acquired by the line acquisition means in association with each other; means for acquiring a distance between the movement target position candidate decided by the movement target position candidate decision means and the position of the rival character; and means for controlling the display style of the line acquired by the line acquisition means based on the display style information associated with the distance range to which the distance between the movement target position candidate decided by the movement target position candidate decision means and the position of the rival character belongs.

According to an aspect of the present invention, a plurality of the rival characters may be located in the game space, and the display control means may include: means for storing a parameter condition related to a predetermined parameter of the rival character and display style information related to the display style of the line acquired by the line acquisition means in association with each other; selection means for selecting at least one of the plurality of rival characters based on the movement target position candidate decided by the movement target position candidate decision means and a position of each of the plurality of rival characters; means for judging whether or not the parameter condition associated with the display style information is satisfied by the predetermined parameter of the rival character selected by the selection means; and means for controlling, if the parameter condition is satisfied by the predetermined parameter of the rival character selected by the selection means, the display style of the line acquired by the line acquisition means based on the display style information associated with the parameter condition.

According to the present invention, a game device, which displays a game screen showing a mobile character moving toward a position designated by a user, includes: designation position acquisition means for acquiring the position designated by the user; movement target position candidate decision means for deciding a movement target position candidate for the mobile character; line acquisition means for acquiring a curve connecting a position of the mobile character, the position acquired by the designation position acquisition means, and the movement target position candidate decided by the movement target position candidate decision means; and display control means for displaying at least a part of the curve acquired by the line acquisition means on the game screen.

The present invention relates to the game device which displays the game screen showing the mobile character moving toward the position designated by the user. In the present invention, the position designated by the user is acquired. In addition, the movement target position candidate for the mobile character is decided. Then, the curve connecting the position of the mobile character, the position designated by the user, and the movement target position candidate is acquired. Then, at least a part of the curve is displayed on the game screen. According to the present invention, it becomes possible for the user to recognize the movement target position candidate for the mobile character at a glance.

BEST MODE FOR CARRYING OUT THE INVENTION

Hereinafter, detailed description is given of an example of an embodiment of the present invention based on the figures. A game device according to the embodiment of the present invention is implemented by, for example, a home-use game device, a portable game device, a mobile phone, a personal digital assistant (PDA), or a personal computer. Herein, description is given of a case where the game device according to the embodiment of the present invention is implemented by a home-use game device.

Figure 1:
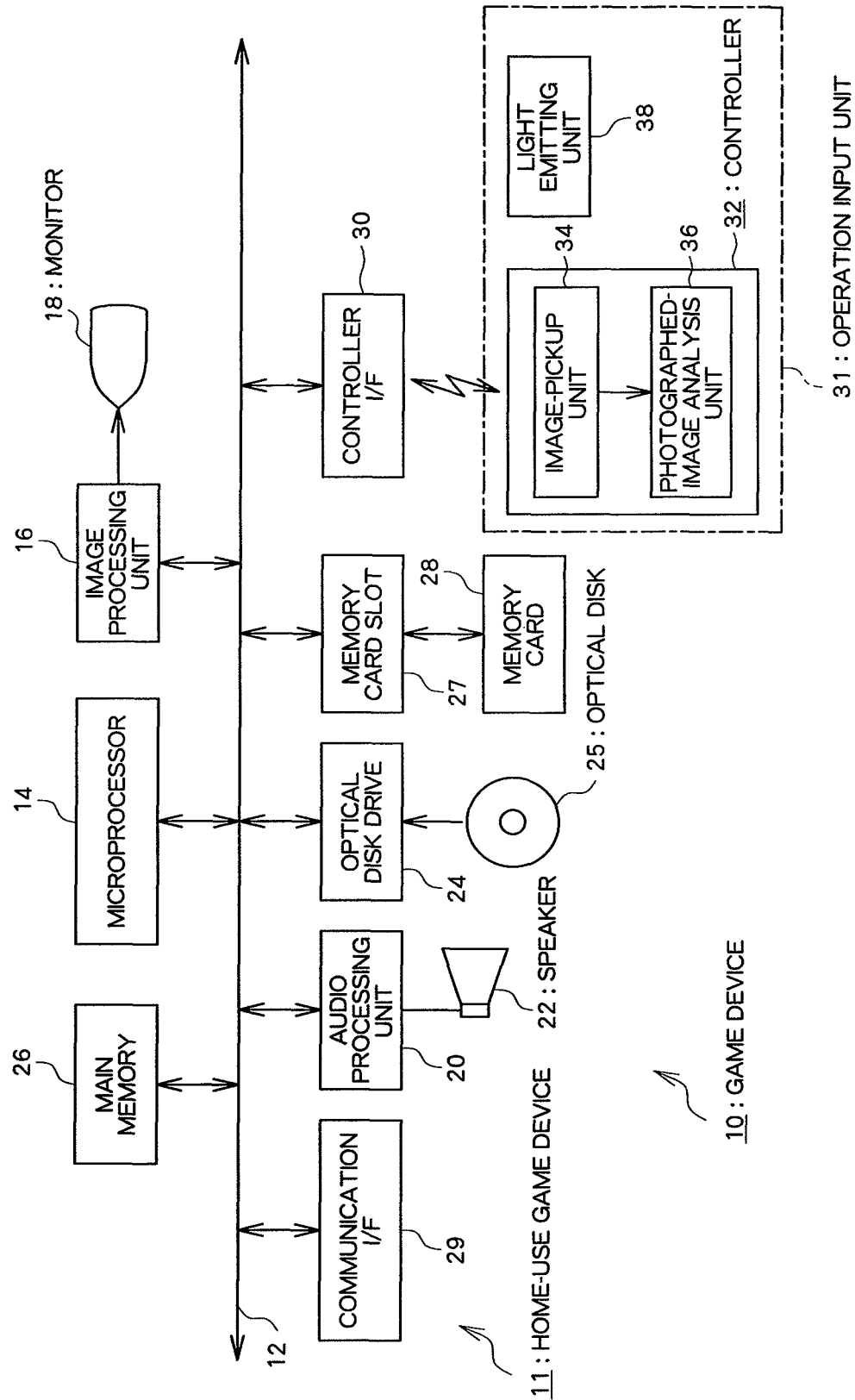
FIG. 1 is a diagram illustrating a hardware configuration of a game device according to an embodiment of the present invention.

FIG. 1 is a diagram illustrating a configuration of the game device according to the embodiment of the present invention. A game device 10 illustrated in FIG. 1 includes a home-use game device 11, an optical disk 25, a memory card 28, a monitor 18, and a speaker 22. The optical disk 25 and the memory card 28 are information storage media. The optical disk 25 and the memory card 28 are inserted into the home-use game device 11. The monitor 18 and the speaker 22 are connected to the home-use game device 11. A CD-ROM or a DVD-ROM, for example, is used as the optical disk 25. A household television set, for example, is used as the monitor 18. A speaker built into the household television set, for example, is used as the speaker 22.

The home-use game device 11 is a well-known computer game system. The home-use game device 11 includes a bus 12, a microprocessor 14, an image processing unit 16, an audio processing unit 20, an optical disk drive 24, a memory card slot 27, a communication interface (I/F) 29, a controller interface (I/F) 30, and an operation input unit 31. The configurational components other than the operation input unit 31 are accommodated in an enclosure of the home-use game device 11.

The bus 12 is for exchanging addresses and data among the units of the home-use game device 11. The microprocessor 14, the image processing unit 16, the audio processing unit 20, the optical disk drive 24, a main memory 26, the memory card slot 27, the communication interface 29, and the controller interface 30 are connected via the bus 12 so as to communicate data with one another.

The microprocessor 14 controls the individual units of the home-use game device 11 in accordance with an operating system stored in a ROM (not shown), or a program or data read from the optical disk 25 or the memory card 28. The main memory 26 includes, for example, a RAM. The program or data read from the optical disk 25 or the memory card 28 are written on the main memory 26 if necessary. The main memory 26 is also used for a working memory of the microprocessor 14.

The image processing unit 16 includes a VRAM. Based on image data sent from the microprocessor 14, the image processing unit 16 renders a game screen in the VRAM. Then, the image processing unit 16 converts the game screen into video signals and outputs the video signals to the monitor 18 at predetermined timings. The audio processing unit 20 includes a sound buffer. The sound buffer stores various categories of sound data such as game music, game sound effects, and messages that are read from the optical disk 25. The audio processing unit 20 reproduces and outputs, from the speaker 22, the various categories of sound data stored in the sound buffer.

The optical disk drive 24 reads the program or data recorded on the optical disk 25 in accordance with an instruction given from the microprocessor 14. In this case, the optical disk 25 is employed for supplying the program or data to the home-use game device 11, but any other information storage media such as ROM cards may also be used. Further, the program or data may also be supplied to the home-use game device 11 from a remote location via a data communication network such as the Internet.

The memory card slot 27 is an interface for insertion of the memory card 28. The memory card 28 includes a nonvolatile memory (for example, EEPROM). The memory card 28 is used for storing various kinds of game data such as saved data. The communication interface 29 is an interface for communicative connection to a data communication network such as the Internet.

The controller interface 30 is an interface for allowing a plurality of controllers 32 to perform wireless connection. As the controller interface 30, it is possible to use, for example, an interface conforming to the Bluetooth interface standards. Note that the controller interface 30 may be an interface for allowing the controller 32 to perform wired connection.

Figure 2:
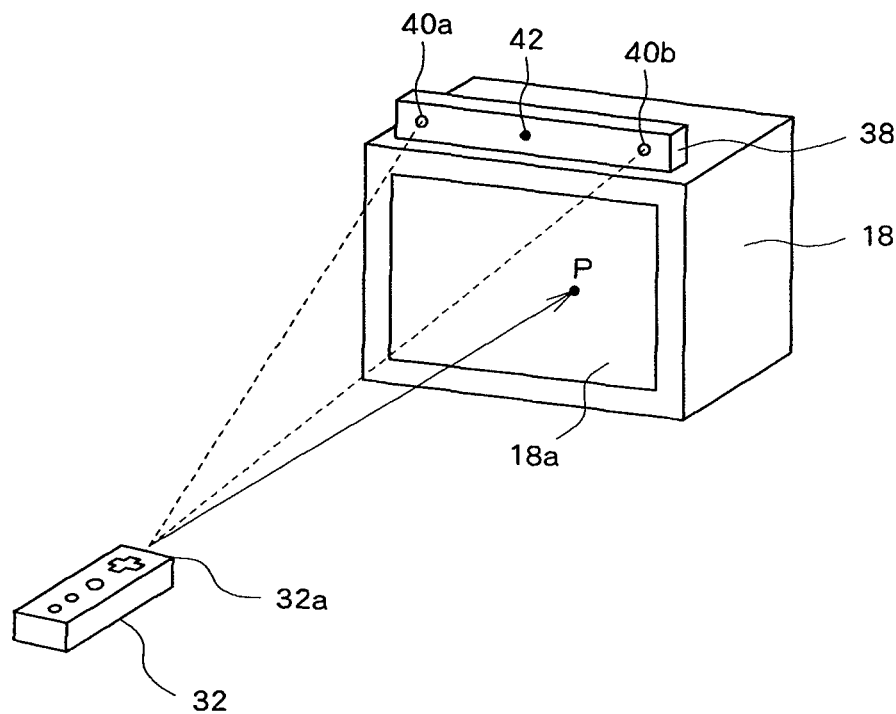
FIG. 2 is a diagram illustrating an example of an operation input unit.
Figure 3:
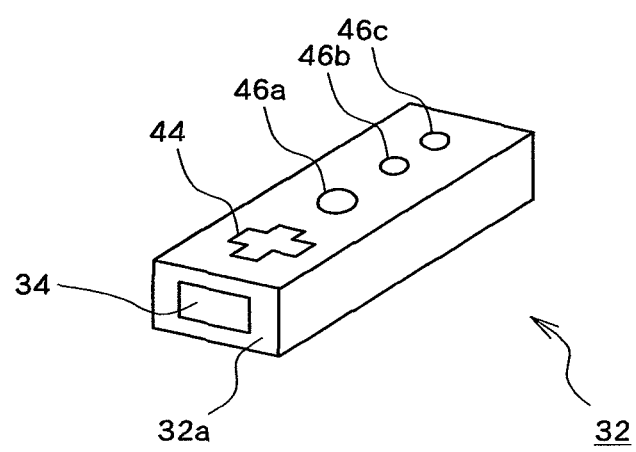
FIG. 3 is a diagram illustrating an example of a controller.

The operation input unit 31 is used for allowing a user to perform an operation input. The operation input unit 31 has a function as, for example, a pointing device for allowing the user to point at a position on the game screen displayed on the monitor 18. As the operation input unit 31, it is possible to use, for example, technology disclosed in JP3262677B. The operation input unit 31 includes one or a plurality of controllers 32 and one light emitting unit 38. The controllers 32 each include an image-pickup unit 34 and a photographed-image analysis unit 36. FIG. 2 is a diagram illustrating an example of the operation input unit 31. FIG. 3 is a diagram illustrating an example of the controller 32.

As illustrated in FIG. 2, the light emitting unit 38 is disposed on top of the monitor 18. It should be noted that the light emitting unit 38 may be disposed under the monitor 18. The light emitting unit 38 is provided with light sources 40a and 40b on both end portions thereof. As illustrated in FIG. 3, the controller 32 is provided with a direction button 44 and buttons 46a, 46b, and 46c on a surface thereof. The direction button 44 has a cross shape, and is generally used to instruct which direction a character or a cursor be moved toward. The buttons 46a, 46b, and 46c are used for various kinds of game operations. The controller 32 is provided with, for example, the image-pickup unit 34 serving as an image-pickup element, such as a CCD, on a side surface thereof. In addition, the controller 32 has, for example, the photographed-image analysis unit 36, such as a microprocessor, built therein. Note that a side surface portion to which the image-pickup unit 34 is provided is referred to as a "front end portion 32a of the controller 32".

When the user aims the front end portion 32a of the controller 32 at the monitor 18, the light sources 40a and 40b are reflected on a photographed image of the image-pickup unit 34. The photographed-image analysis unit 36 analyzes the positions of the light sources 40a and 40b reflected on the photographed image of the image-pickup unit 34. The photographed-image analysis unit 36 acquires a position and an inclination of the controller 32 based on the analysis results. More specifically, the photographed-image analysis unit 36 calculates a relative position of the controller 32 with respect to a predetermined reference position 42 and an inclination angle of the controller 32 with respect to a straight line that connects the light sources 40a and 40b. The game device 10 stores information related to a positional relationship between the reference position 42 and the game screen 18a displayed on the monitor 18, and based on the information and the position and the inclination of the controller 32 acquired by the photographed-image analysis unit 36, a screen coordinate value of a position P pointed at by the front end portion 32a of the controller 32 is acquired.

Figure 4:
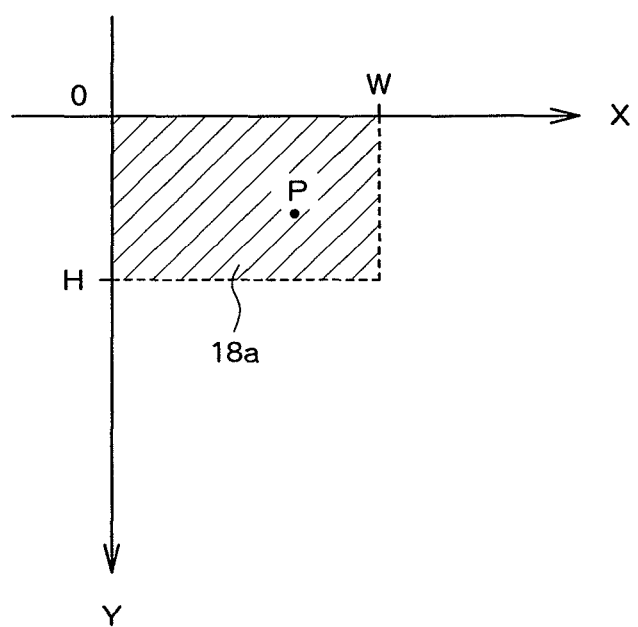
FIG. 4 is a diagram illustrating a screen coordinate system.

Here, the screen coordinate value represents a coordinate value in a screen coordinate system. As illustrated in FIG. 4, the screen coordinate system represents a coordinate system in which the origin point is set to the top left corner of the game screen 18a, the X-axis positive direction is set to the rightward direction of the game screen 18a, and the Y-axis positive direction is set to the downward direction of the game screen 18a. As illustrated in FIG. 4, a predetermined region in the screen coordinate system, that is, a region (diagonally shaded region) that satisfies the condition "$0 \leq X \leq W$ and $0 \leq Y \leq H$" is the region displayed on the monitor 18. Note that "W" denotes a width of the game screen 18a, and "H" denotes a height of the game screen 18a.

Note that the position P pointed at by the front end portion 32a of the controller 32 is referred to as a "designation position of the controller 32". In addition, the information indicating the position and the inclination of the controller 32 acquired by the photographed-image analysis unit 36, that is, information for identifying the screen coordinate value of the designation position of the controller 32, is referred to as "pointing information".

An operation signal indicating an operation state of the controller 32 is transmitted every predetermined cycle (for example, every 1/60th of a second) from the controller 32 to the controller interface 30. The operation signal includes, for example, identification information for identifying the controller 32, the above-mentioned pointing information, and information indicating a depression state of each button. The controller interface 30 passes the operation signal received from the controller 32 to the microprocessor 14 via the bus 12. The microprocessor 14 judges a game operation performed in each controller 32 based on the operation signal. For example, the microprocessor 14 identifies the designation position of each controller 32 based on the operation signal (pointing information). Further, for example, based on the operation signal, the microprocessor 14 judges whether or not there is a depression operation of the direction button 44 and the buttons 46a, 46b, and 46c on each controller 32.

On the game device 10 provided with the above-mentioned configuration, for example, a soccer game that simulates a soccer match between a user's operation subject team (hereinafter, referred to as "user team") and an opposing team is played. The soccer game is realized by executing a soccer game program read from the optical disk 25.

Figure 5:
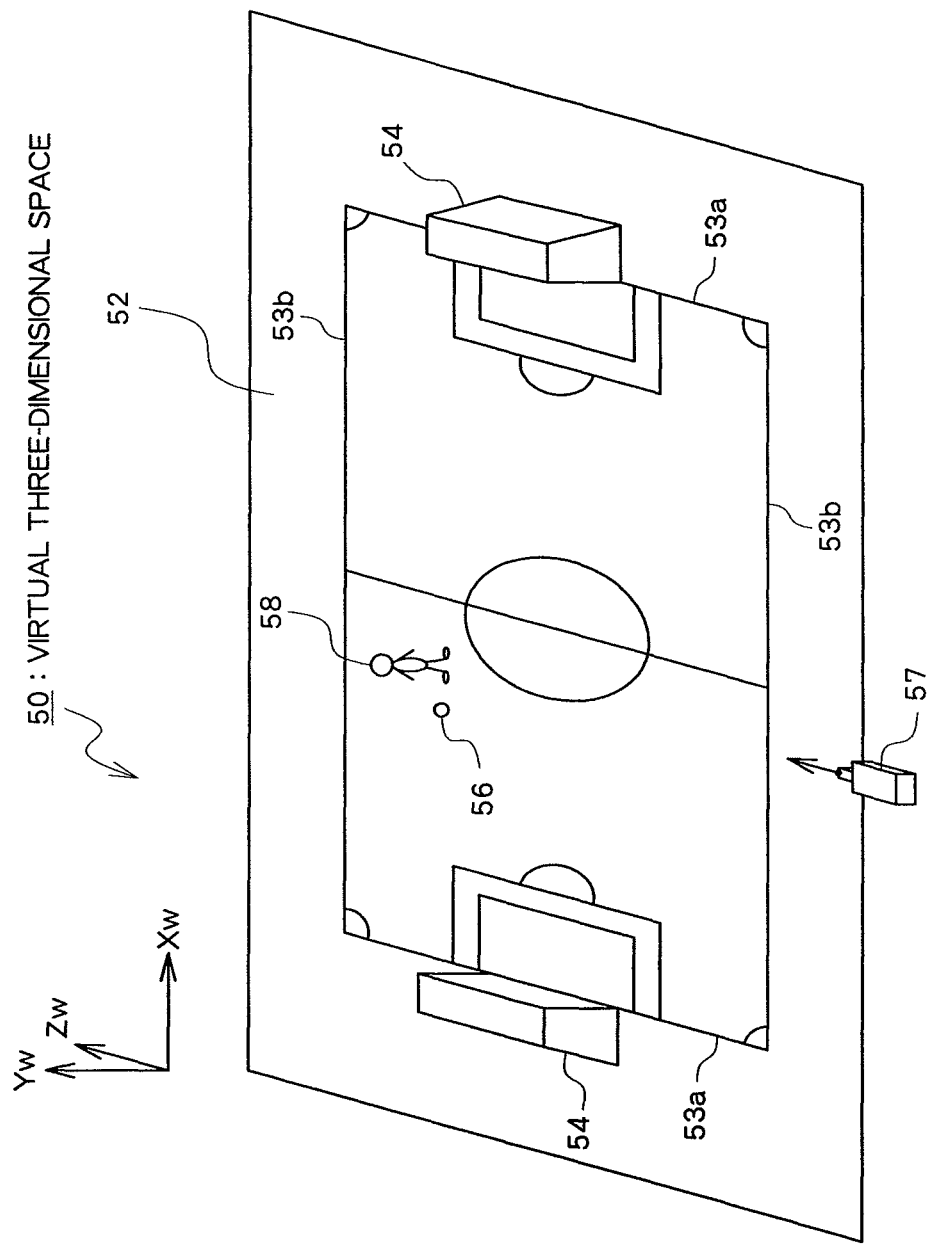
FIG. 5 is a diagram illustrating an example of a virtual three-dimensional space.

A virtual three-dimensional space (game space) is built in the main memory 26 of the game device 10. FIG. 5 illustrates an example of the virtual three-dimensional space. As illustrated in FIG. 5, a field object 52 representing a soccer field and goal objects 54 each representing a goal are located in a virtual three-dimensional space 50, which forms a soccer match venue. Displayed on the field object 52 are goal lines 53a, touch lines 53b, and the like. Located on the field object 52 are a ball object 56 representing a soccer ball and a player object 58 representing a soccer player. Though omitted from FIG. 5, 11 player objects 58 belonging to the user team and 11 player objects 58 belonging to the opposing team are located on the field object 52.

A virtual camera 57 (viewpoint and viewing direction) is set in the virtual three-dimensional space 50. For example, the virtual camera 57 moves according to the movement of the ball object 56. A state of the virtual three-dimensional space 50 viewed from the virtual camera 57 is displayed on the game screen 18a.

Figure 6:
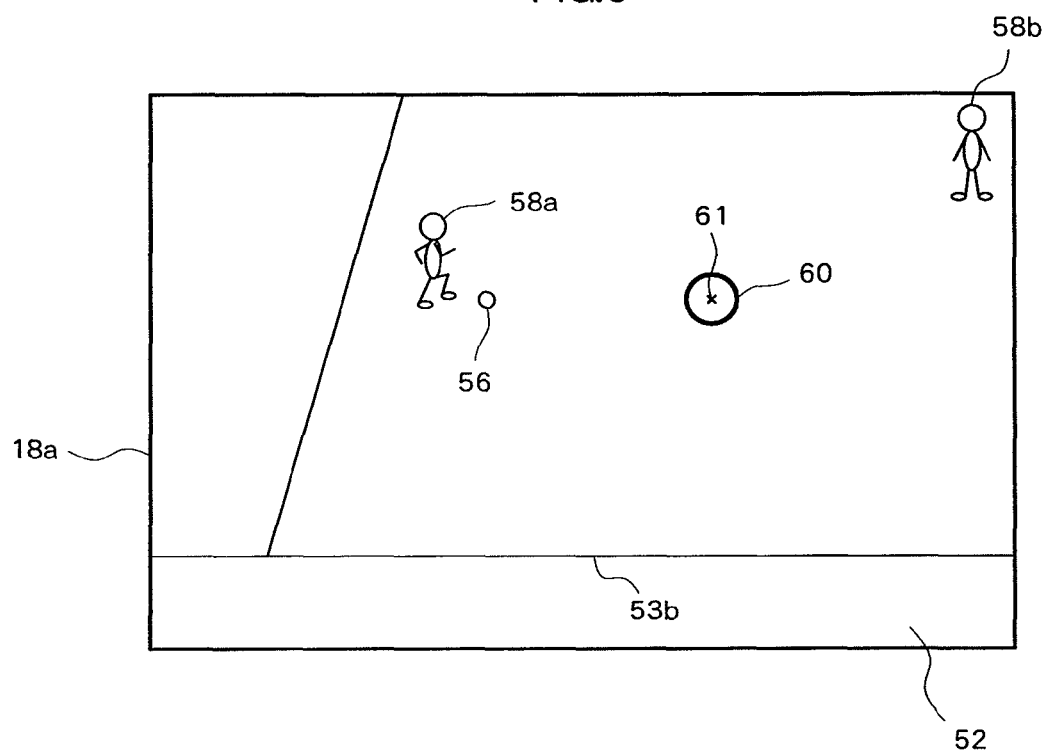
FIG. 6 is a diagram illustrating an example of a game screen.

FIG. 6 illustrates an example of the game screen 18a. As illustrated in FIG. 6, an image showing a state of the virtual three-dimensional space 50 viewed from the virtual camera 57 is displayed on the game screen 18a. Further displayed on the game screen 18a is a cursor 60 indicating the designation position of the controller 32. In this embodiment, the cursor 60 has a circular shape. A center position 61 of the cursor 60 indicates the designation position of the controller 32. The shape of the cursor 60 may be a shape other than the circular shape. Note that in FIG. 6, a player object 58a represents the player object 58 (mobile character) of the user's operation subject, and a player object 58b represents the player object 58 (rival character) belonging to the opposing team. In addition, FIG. 6 shows a state in which the player object 58a is keeping the ball object 56.

On the game screen 18a illustrated in FIG. 6, the user designates a movement target position for (moving direction of) the player object 58a by pointing to a position with the front end portion 32a of the controller 32. The player object 58a moves toward a position on the field object 52 corresponding to a display position (center position 61) of the cursor 60. Note that in a case where the player object 58a is keeping the ball object 56, the ball object 56 also moves toward the position on the field object 52 corresponding to a display position of the cursor 60. The state is shown as a dribbling action of the player object 58a.

Further, on the game screen 18a illustrated in FIG. 6, the user designates a kicking direction of the player object 58a by pointing in a direction with the front end portion 32a of the controller 32. If the user depresses a kick instructing button (for example, button 46a), the player object 58a starts to kick the ball object 56 toward the position on the field object 52 corresponding to the display position of the cursor 60. For example, if the user depresses the kick instructing button while the cursor 60 has been moved to the position of another player object 58, a pass is performed toward the player object 58.

The game device 10 is provided with a function of guiding the user to a recommended movement target position (moving direction) (hereinafter, referred to as "movement target position candidate guidance function"). Specifically, if the user depresses a guidance button (for example, button 46b), an image for guiding the user to the recommended movement target position is displayed.

Figure 7:
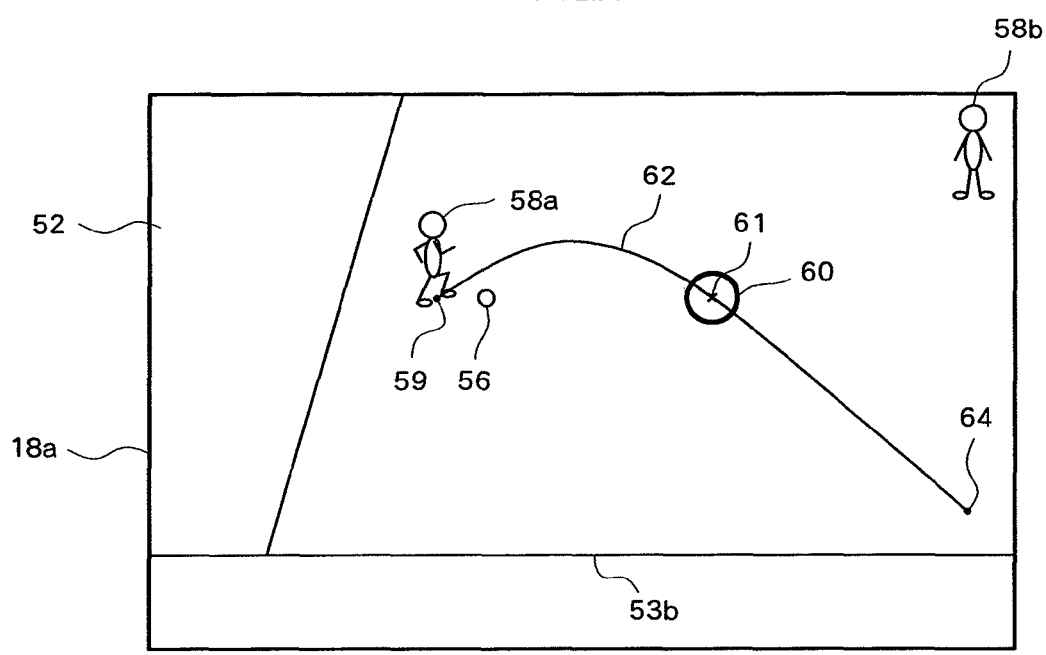
FIG. 7 is a diagram illustrating an example of the game screen.

FIG. 7 illustrates an example of the game screen 18a in a case where the user depresses the guidance button. As illustrated in FIG. 7, a movement target position candidate guidance image 62 is displayed on the game screen 18a in this case. As illustrated in FIG. 7, the movement target position candidate guidance image 62 is set as an image representing a curve connecting a foot position 59 of the player object 58a, the center position 61 of the cursor 60, and a movement target position candidate 64. In the movement target position candidate guidance image 62, a line connecting the foot position 59 of the player object 58a and the center position 61 of the cursor 60 is displayed particularly as a curve. This makes it possible for the user to recognize a relationship among the foot position 59 of the player object 58a, the center position 61 (display position) of the cursor 60, and the movement target position candidate 64 at a glance based on a curved manner of the movement target position candidate guidance image 62 (line portion connecting the foot position 59 of the player object 58a and the center position 61 of the cursor 60).

As a result, the user becomes able to recognize the recommended movement target position (moving direction) at a glance.

Hereinafter, description is given of a configuration related to the above-mentioned movement target position candidate guidance function.

Figure 8:
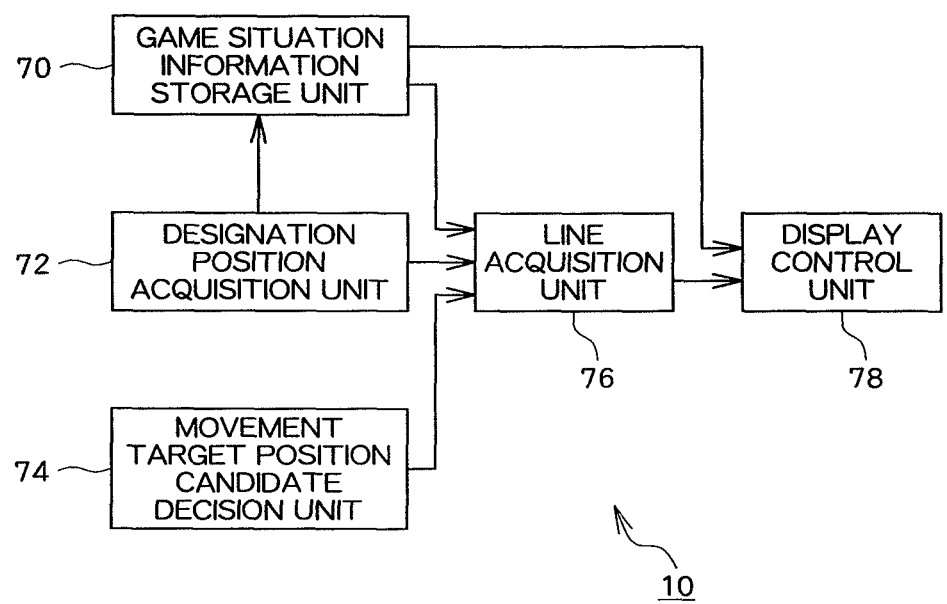
FIG. 8 is a functional block diagram of the game device according to the embodiment.

First, description is given of functions implemented by the game device 10. FIG. 8 is a functional block diagram mainly illustrating functions related to the present invention among the functions implemented by the game device 10. As illustrated in FIG. 8, the game device 10 functionally includes a game situation information storage unit 70, a designation position acquisition unit 72, a movement target position candidate decision unit 74, a line acquisition unit 76, and a display control unit 78. Those functional blocks are implemented by the microprocessor 14 executing a program read from the optical disk 25.

The game situation information storage unit 70 is implemented mainly by the main memory 26 and the optical disk 25. The game situation information storage unit 70 stores game situation information indicating a situation of the game. For example, the game situation information storage unit 70 stores information that indicates the display position (center position 61) of the cursor 60 by a screen coordinate system. Further, for example, the game situation information storage unit 70 stores information that indicates the state (position, moving speed, and moving direction) of the ball object 56 within the virtual three-dimensional space 50 using a world coordinate system (XwYwZw-coordinate system illustrated in FIG. 5). Further, for example, the game situation information storage unit 70 stores information that indicates the state (position, posture, moving speed, and moving direction) of each of the player objects 58 within the virtual three-dimensional space 50 using the world coordinate system. Note that the game situation information storage unit 70 stores therein, for each of the player objects 58, numerical parameters indicating levels of various capabilities of the player object 58. For example, a speed parameter indicating a distance the player object 58 can move in a predetermined time (for example, 1/60th of a second) is stored. Further, for example, a defense ability parameter indicating a level of a defense ability of the player object 58 is stored.

The designation position acquisition unit 72 is implemented mainly by the microprocessor 14, the main memory 26, and the operation input unit 31. The designation position acquisition unit 72 acquires a position designated by the user. In this embodiment, based on an operation signal (pointing information) supplied from the controller 32, the designation position acquisition unit 72 acquires a screen coordinate value of a designation position of the controller 32. Further, the designation position acquisition unit 72 acquires a position (position on the field object 52) within the virtual three-dimensional space 50 corresponding to the screen coordinate value. Details thereof are described later (see Steps S101 and S102 of FIG. 9 and FIGS. 10 to 14).

The movement target position candidate decision unit 74 is implemented mainly by the microprocessor 14 and the main memory 26. The movement target position candidate decision unit 74 decides the movement target position candidate 64 for the player object 58 of the user's operation subject. In this embodiment, from among positions on the field object 52, the movement target position candidate decision unit 74 selects a position (free space) around which no player object 58 is located as the movement target position candidate 64. In addition, from among positions on the field object 52, the movement target position candidate decision unit 74 selects such a position as can be reached by the player object 58 of the user's operation subject earlier than by another player object 58 as the movement target position candidate 64. Details thereof are described later (see Step S105 of FIG. 9 and FIG. 15).

The line acquisition unit 76 is implemented mainly by the microprocessor 14 and the main memory 26. The line acquisition unit 76 acquires a line connecting the position of the player object 58 of the user's operation subject within the virtual three-dimensional space 50 and the position within the virtual three-dimensional space 50 corresponding to the designation position (screen coordinate value) of the controller 32. Further, the line acquisition unit 76 controls the curved manner of the line connecting the position of the player object 58 of the user's operation subject within the virtual three-dimensional space 50 and the position within the virtual three-dimensional space 50 corresponding to the designation position (screen coordinate value) of the controller 32 based on the position within the virtual three-dimensional space 50 corresponding to the designation position (screen coordinate value) of the controller 32 and the movement target position candidate 64 decided by the movement target position candidate decision unit 74. In this embodiment, the line acquisition unit 76 acquires a curve connecting the position of the player object 58 of the user's operation subject within the virtual three-dimensional space 50, the position within the virtual three-dimensional space 50 corresponding to the designation position (screen coordinate value) of the controller 32, and the movement target position candidate 64 decided by the movement target position candidate decision unit 74. Details thereof are described later (see Step S106 of FIG. 9 and FIG. 16).

The display control unit 78 is implemented mainly by the microprocessor 14, the main memory 26, and the image processing unit 16. The display control unit 78 generates the game screen 18a based on the game situation information stored in the game situation information storage unit 70. Further, the display control unit 78 causes at least a part of the line acquired by the line acquisition unit 76 to be displayed on the game screen 18a. Details thereof are described later (see Step S107 of FIG. 9).

Figure 9:
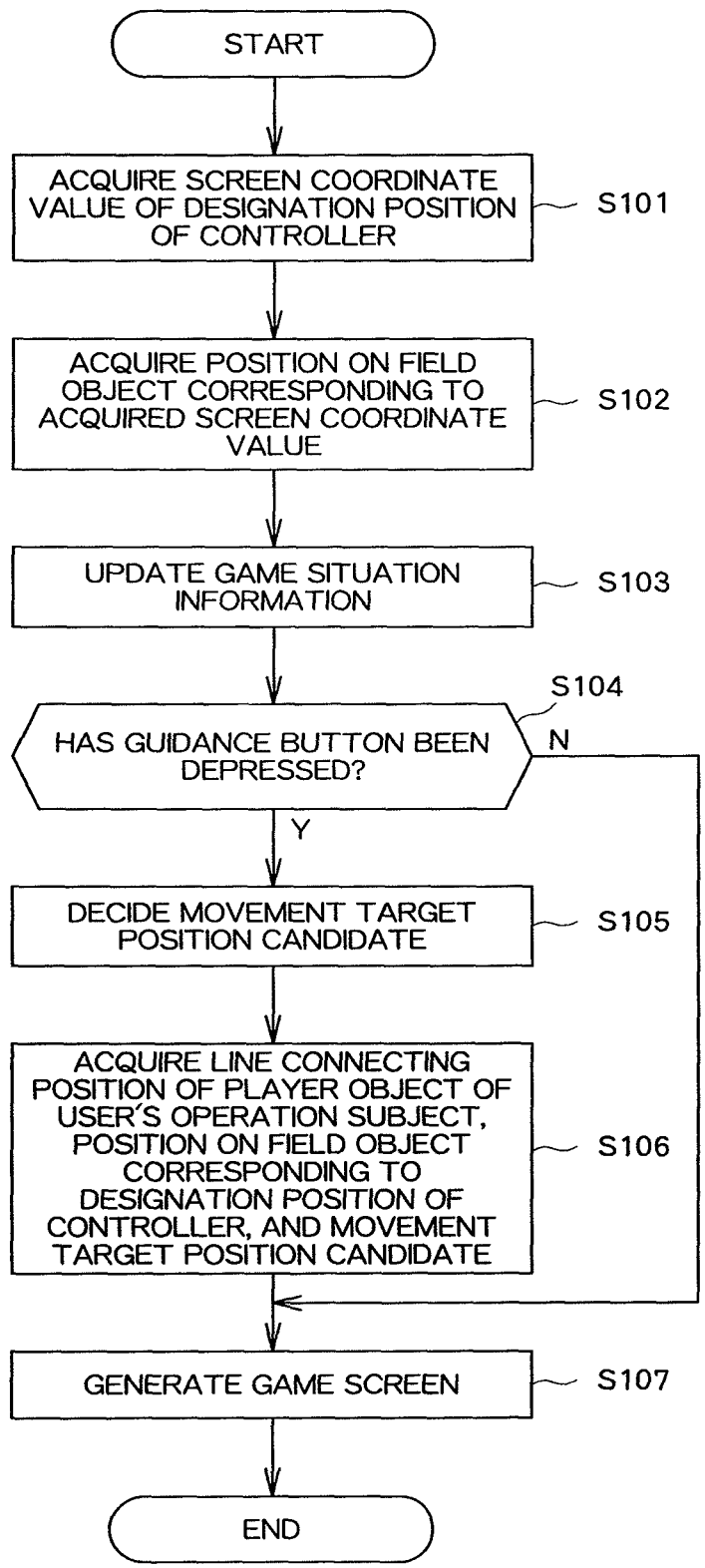
FIG. 9 is a flowchart illustrating processing executed on the game device.

Next, description is given of processing (the program) executed by the game device 10. FIG. 9 is a flowchart mainly illustrating processing related to the movement target position candidate guidance function among the processing executed by the game device 10 every predetermined time (in this embodiment, 1/60th of a second). The processing is executed by the microprocessor 14 to thereby implement the functional blocks illustrated in FIG. 8.

As illustrated in FIG. 9, first, the game device 10 (designation position acquisition unit 72) acquires the screen coordinate value of the designation position of the controller 32 based on the pointing information supplied from the controller 32 (S101). Then, the game device 10 (designation position acquisition unit 72) acquires the position on the field object 52 corresponding to the screen coordinate value acquired in Step S101 (S102).

Figure 10:
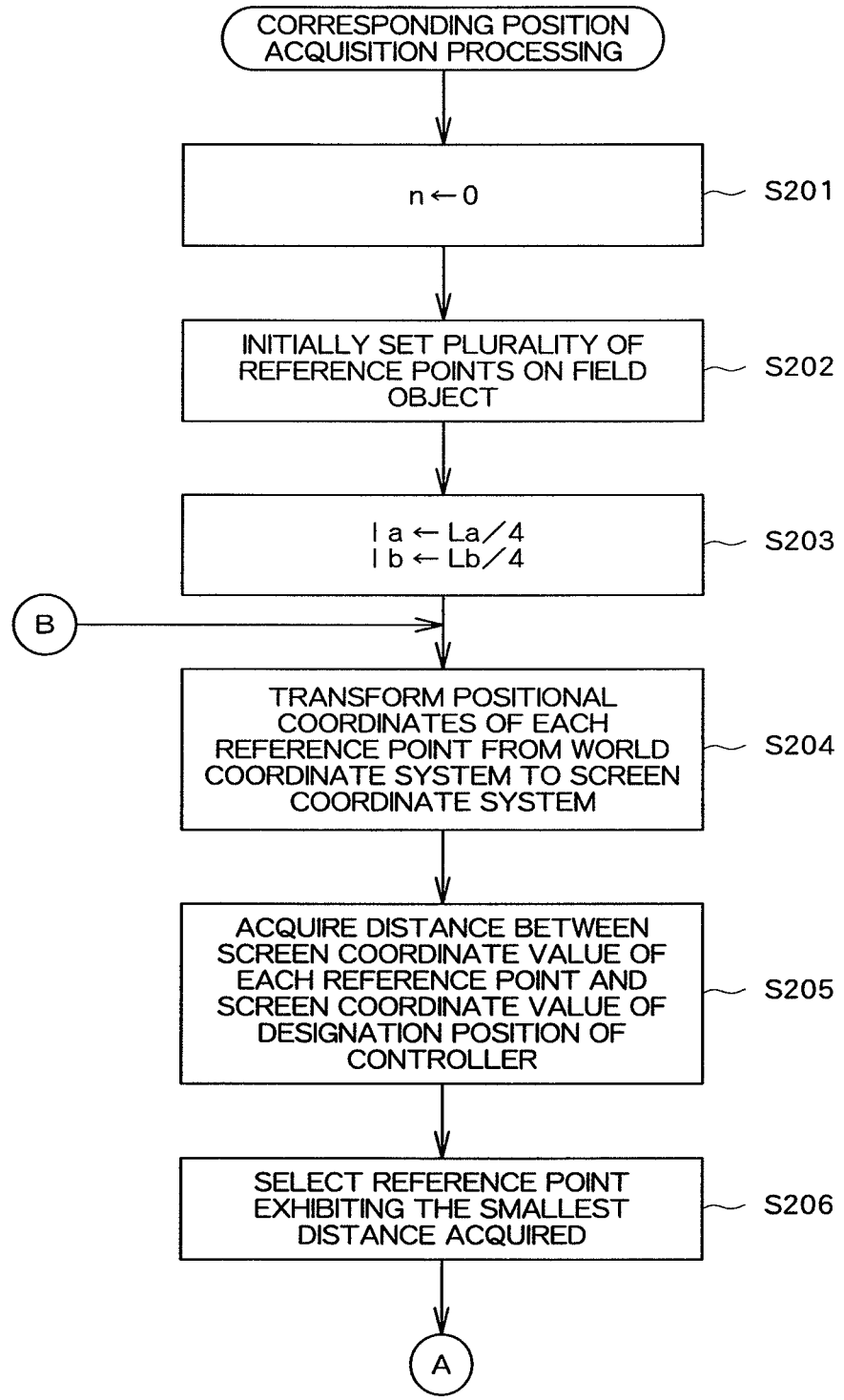
FIG. 10 is a flowchart illustrating the processing executed on the game device.
Figure 11:
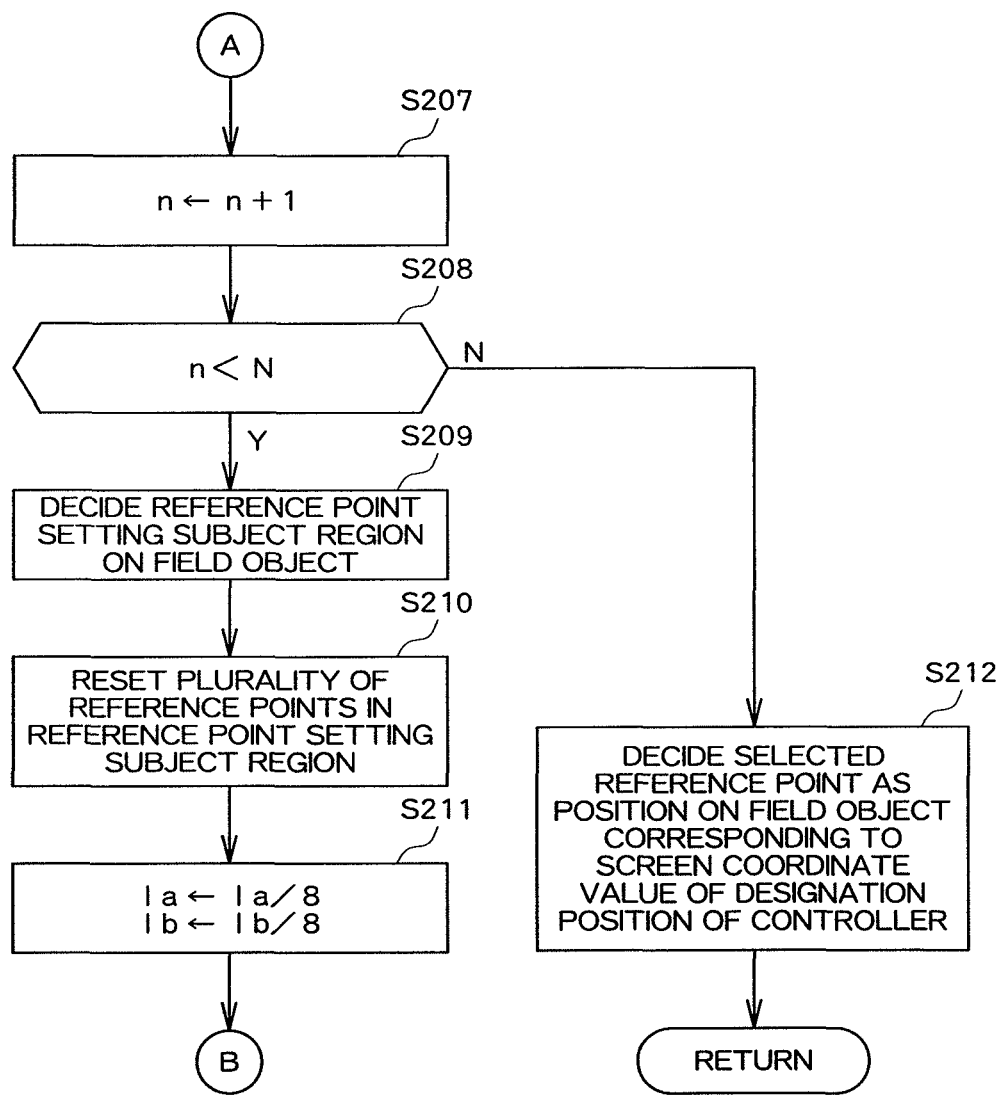
FIG. 11 is a flowchart illustrating the processing executed on the game device.

Here, description is given of processing (corresponding position acquisition processing) for acquiring the position on the field object 52 corresponding to the screen coordinate value acquired in Step S101. FIGS. 10 and 11 are flowcharts illustrating the corresponding position acquisition processing.

Figure 12:
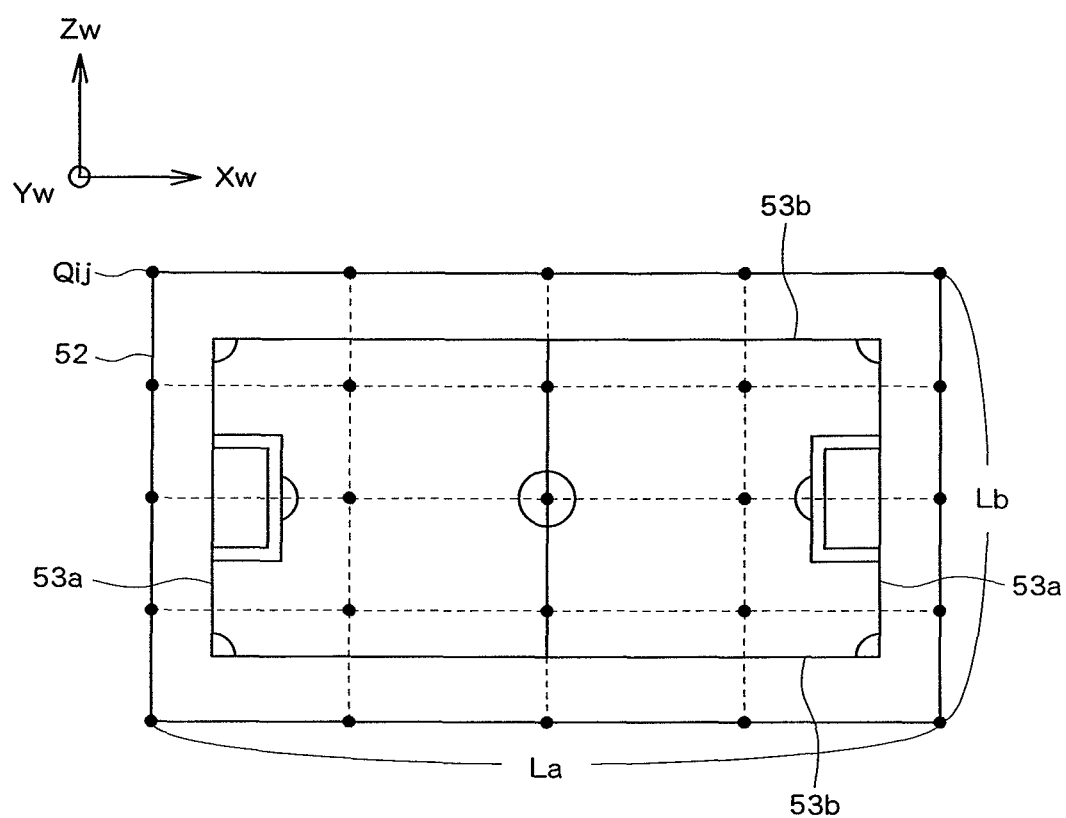
FIG. 12 is a diagram for describing an initial setting of a reference point.

As illustrated in FIG. 10, the game device 10 first initializes a value of a variable "n" to 0 (S201). Further, the game device 10 initially sets a plurality of reference points on the field object 52 (S202). FIG. 12 is a diagram for describing the initial setting of the reference points. As illustrated in FIG. 12, the game device 10 acquires each vertex of blocks obtained by dividing each sides of the field object 52 into four along a long-side direction and a short-side direction, as a reference point $Q_{ij}$ (where "i" and "j" are each an integer selected from 1 to 5). Here, the reference point $Q_{11}$ denotes a reference point on the top left, while the reference point $Q_{15}$ denotes a reference point on the top right. Similarly, the reference point $Q_{51}$ denotes a reference point on the bottom left, while the reference point $Q_{55}$ denotes a reference point on the bottom right.

Further, the game device 10 initializes a variable "la" to La/4, and initializes a variable "lb" to Lb/4 (S203). Here, as illustrated in FIG. 12, "La" denotes a length of a long side of the field object 52, while "Lb" denotes a length of a short side of the field object 52.

After that, the game device 10 transforms positional coordinates of each reference point $Q_{ij}$ from the world coordinate system to the screen coordinate system to thereby acquire the screen coordinate value corresponding to each reference point $Q_{ij}$ (S204). Here, the same matrix calculation is used as the matrix calculation used when generating a field-of-view image showing the state of the virtual three-dimensional space 50 viewed from the virtual camera 57 (Step S107 of FIG. 9).

After that, with regard to each reference point $Q_{ij}$, the game device 10 calculates a distance between the screen coordinate value corresponding to the reference point $Q_{ij}$ and the screen coordinate value acquired in Step S101 (S205). Then, the game device 10 selects a reference point $Q_{ij}$ exhibiting the smallest distance calculated in Step S205 from among the plurality of reference points $Q_{ij}$ (S206). Further, the game device 10 adds 1 to the value of the variable "n" (S207). The game device 10 then judges whether or not the value of the variable "n" is smaller than "N" (S208).

Figure 13:
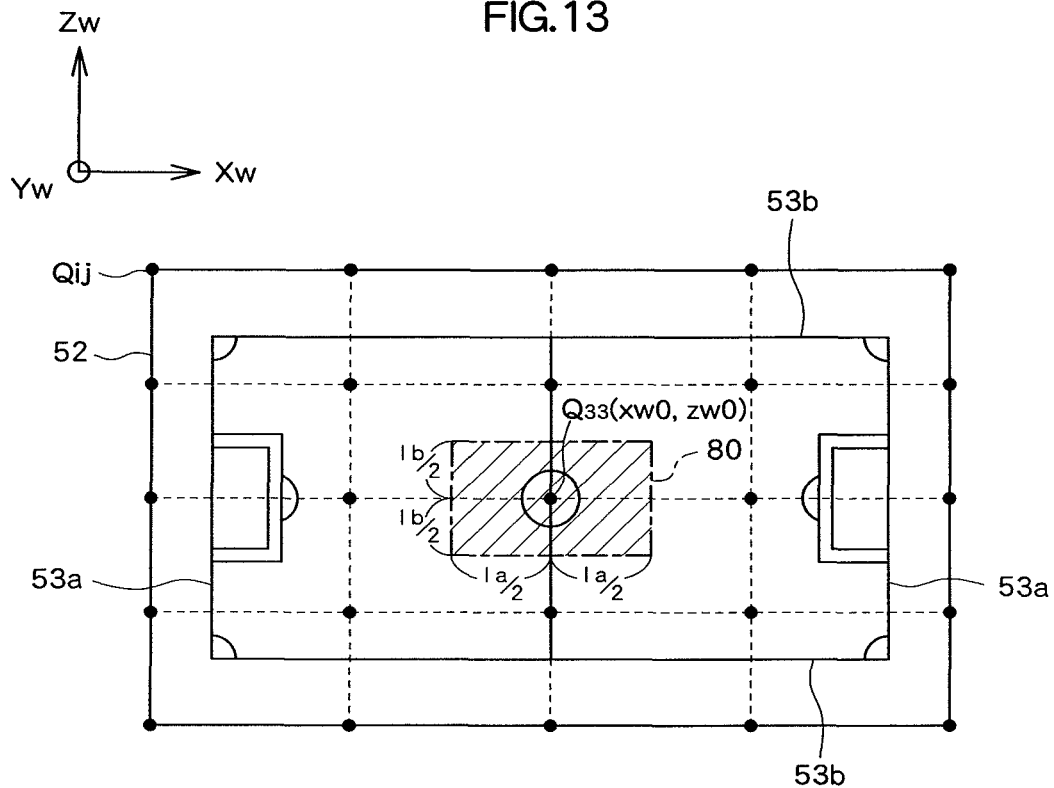
FIG. 13 is a diagram for describing a reference point setting subject region.

If the value of the variable "n" is smaller than "N", the game device 10 decides a reference point setting subject region on the field object 52 based on the reference point $Q_{ij}$ selected in Step S206 (S209). FIG. 13 is a diagram for describing the reference point setting subject region. Here, FIG. 13 illustrates the reference point setting subject region in a case where the reference point $Q_{33}$ is selected in Step S206 with the reference point $Q_{ij}$ set as illustrated in FIG. 12. As illustrated in FIG. 13, the game device 10 sets a region on the field object 52, which includes the Xw-axis coordinate and the Zw-axis coordinate (xw, zw) that satisfy the following conditions (1) and (2), as a reference point setting subject region 80. Note that in the following conditions (1) and (2), (xw0, zw0) represents the Xw-axis coordinate and the Zw-axis coordinate of the reference point $Q_{ij}$ selected in Step S206, respectively.

$$xw0-(la/2) \leq xw \leq xw0+(la/2) \quad (1)$$

$$zw0-(lb/2) \leq zw \leq zw0+(lb/2) \quad (2)$$

Figure 14:
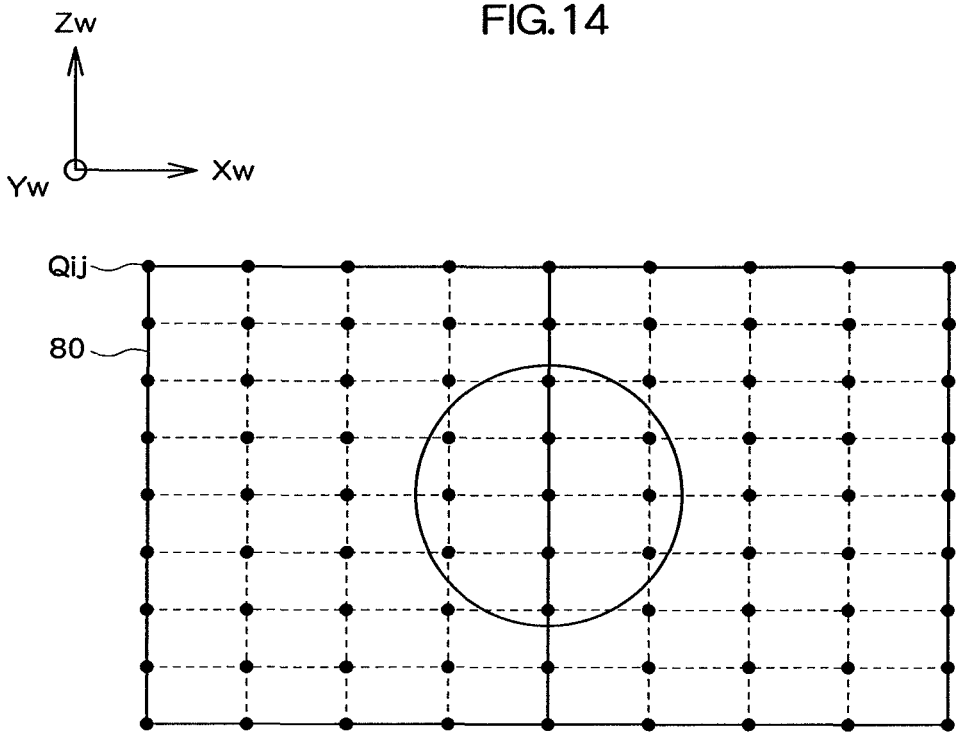
FIG. 14 is a diagram for describing resetting of the reference point.

Then, the game device 10 resets a plurality of reference points in the reference point setting subject region 80 decided in Step S209 (S210). FIG. 14 is a diagram for describing the resetting of the reference points. Here, FIG. 14 illustrates a case where the reference point setting subject region 80 is decided as illustrated in FIG. 13. As illustrated in FIG. 14, the game device 10 sets each vertex of each of blocks obtained by dividing each side of the reference point setting subject region 80 into eight along the long-side direction and the short-side direction, as a new reference point $Q_{ij}$ (where "i" and "j" are each an integer selected from 1 to 9). Here, the reference point $Q_{11}$ denotes the reference point on the top left, while the reference point $Q_{19}$ denotes the reference point on the top right. Similarly, the reference point $Q_{91}$ denotes the reference point on the bottom left, while the reference point $Q_{99}$ denotes the reference point on the bottom right.

After resetting the reference points $Q_{ij}$, the game device 10 updates the variable "la" to la/8, and updates the variable "lb" to lb/8 (S211). After that, the game device 10 again executes the processing from Step S204.

Meanwhile, if it is judged in Step S208 that the value of the variable "n" is not smaller than "N", the game device 10 judges that the reference point $Q_{ij}$ selected in Step S206 is a position on the field object 52 corresponding to the screen coordinate value acquired in Step S101 (S212).

In the case where the position on the field object 52 corresponding to the screen coordinate value acquired in Step S101 is acquired, as illustrated in FIG. 9, the game device 10 updates the game situation information stored in the main memory 26 (game situation information storage unit 70) (S103). For example, display position information on the cursor 60 is updated based on the screen coordinate value acquired in Step S101. Further, for example, state information on the player object 58 of the user's operation subject is updated based on the position acquired in Step S102 and a depression state of the kick instructing button. Further, for example, in a case where the player object 58 of the user's operation subject is keeping the ball object 56, the state information on the ball object 56 is updated based on the position acquired in Step S102 and the depression state of the kick instructing button. Further, for example, the state information on the player object 58 other than the player object 58 of the user's operation subject is updated according to a predetermined algorithm.

Subsequently, the game device 10 judges whether or not the guidance button has been depressed (S104). Then, if the guidance button has been depressed, the game device 10 (movement target position candidate decision unit 74) decides the movement target position candidate 64 (S105).

Figure 15:
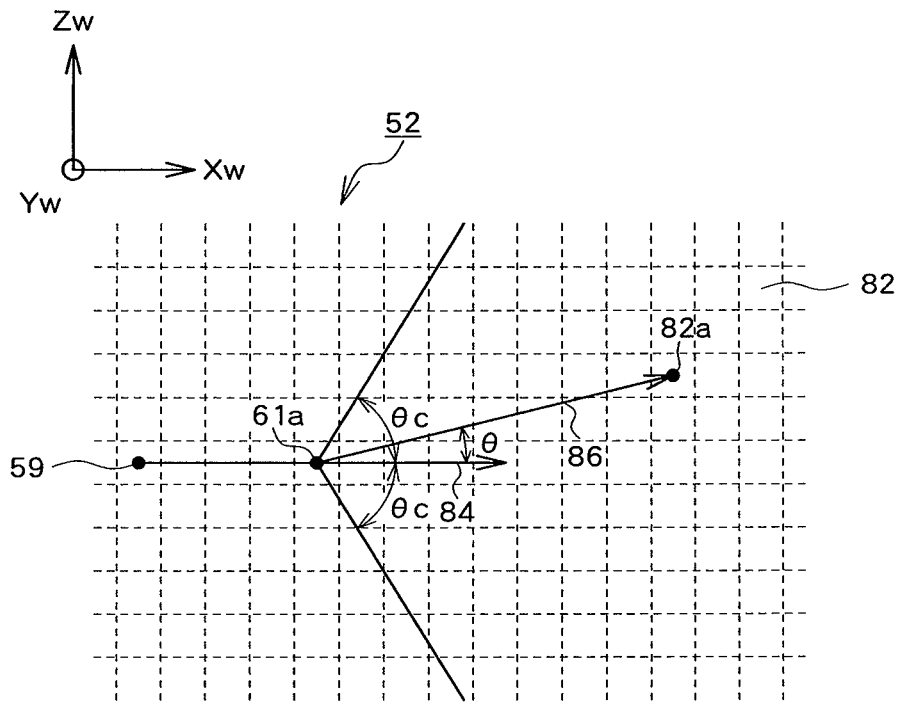
FIG. 15 is a diagram for describing a decision of a movement target position candidate.

Here, description is given of an identification method for the movement target position candidate 64. FIG. 15 is a diagram for describing the identification method for the movement target position candidate 64.

First, the game device 10 virtually sets blocks 82 in a matrix of $m_1 \times m_2$ squares on the field object 52 by dividing the field object 52 into $m_1$ in a long-side direction thereof and $m_2$ in a short-side direction thereof.

Subsequently, the game device 10 acquires a direction 84 from the foot position 59 of the player object 58 of the user's operation subject toward a position 61a (position acquired in Step S102) on the field object 52 corresponding to the display position (center position 61) of the cursor 60.

Then, the game device 10 selects blocks 82 that each satisfy both the following conditions A and B from among the $m_1 \times m_2$ blocks 82.

(Condition A) The block 82 is within a field.

(Condition B) An angle θ between a direction 86 from the position 61a toward a center position 82a of each block 82 and the direction 84 is equal to or less than a predetermined reference angle θc (for example, 60 degrees).

The term "field" in the above-mentioned condition A represents a region surrounded by the goal lines 53a and the touch lines 53b. Note that the reason for providing the above-mentioned condition B is described later.

When the blocks 82 that each satisfy both the above-mentioned conditions A and B are selected, the game device 10 calculates a first arrival time for each of those blocks 82. The first arrival time represents a period of time required until the player object 58 of the user's operation subject arrives at the block 82. Here, first calculated is a distance from the foot position 59 of the player object 58 of the user's operation subject toward the center position 82a of the block 82. Further, the speed parameter of the player object 58 of the user's operation subject is read from the optical disk 25 (game situation information storage unit 70). Then, the calculated distance is divided by a speed indicated by the read speed parameter to thereby calculate the first arrival time.

Subsequently, the game device 10 calculates a second arrival time for each of the blocks 82 that each satisfy both the above-mentioned conditions A and B. The second arrival time represents a period of time required until the player object 58 other than the player object 58 of the user's operation subject arrives at the block 82. The second arrival time is also calculated in the same manner as the first arrival time.

Subsequently, the game device 10 selects one or more blocks 82 that each satisfy both the following conditions C and D from among the blocks 82 that each satisfy both the above-mentioned conditions A and B. Note that if there exist a plurality of blocks 82 that each satisfy both the following conditions C and D, the game device 10 selects one of those blocks 82. For example, the game device 10 selects the block 82 farthest apart from the foot position 59 of the player object 58 of the user's operation subject.

(Condition C) The first arrival time and the second arrival time are equal to or longer than a predetermined reference time.

(Condition D) The first arrival time is shorter than the second arrival time.

Note that the above-mentioned condition C is a condition for finding a block 82 around which no player object 58 is located. The above-mentioned condition D is a condition for finding such a block 82 as can be reached by the player object 58 of the user's operation subject earlier than by other player objects 58.

Then, the game device 10 decides the center position 82a of the block 82 selected as described above as the movement target position candidate 64.

Figure 16:
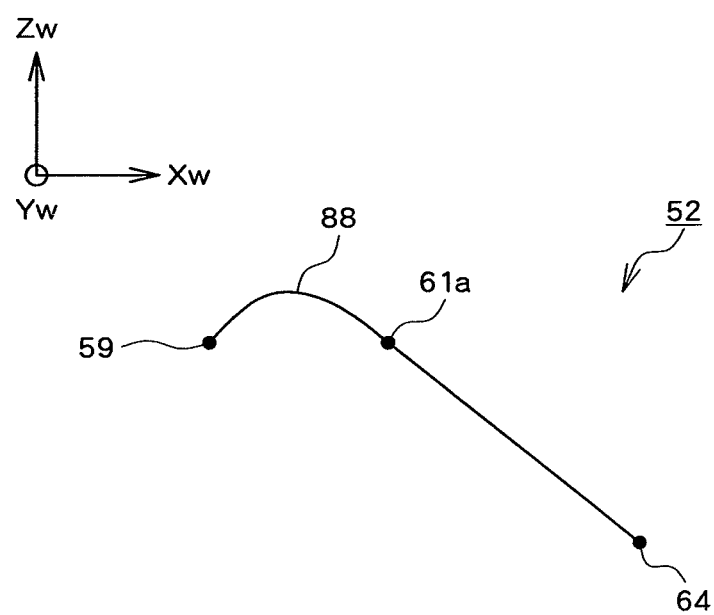
FIG. 16 is a diagram of an example of a line acquired by a line acquisition unit.

As illustrated in FIG. 9, when the movement target position candidate 64 for the player object 58 of the user's operation subject is decided, the game device 10 (line acquisition unit 76) acquires, for example, a line 88 as illustrated in FIG. 16 which connects the foot position 59 of the player object 58 of the user's operation subject, the position 61a acquired in Step S102, and the movement target position candidate 64 decided in Step S105 (S106). In this embodiment, the line 88 is acquired by using a known spline curve generation algorithm. Note that the line 88 may be acquired by another method.

After Step S106 is executed, or if it is judged in Step S104 that the guidance button has not been depressed, the game device 10 (display control unit 78) generates the game screen 18a in a VRAM (S107). First, based on the game situation information stored in the main memory 26 (game situation information storage unit 70), the game device 10 renders a field-of-view image showing the state of the virtual three-dimensional space 50 viewed from the virtual camera 57 in the VRAM. The field-of-view image is generated by coordinate-transforming vertex coordinates (world coordinate value) of polygons of each object located in the virtual three-dimensional space 50 to the screen coordinate system by using a predetermined matrix calculation. Note that if the line 88 has already been acquired by execution of Step S106, an object for indicating the line 88 is located on the field object 52. As a result, the field-of-view image rendered in the VRAM includes the movement target position candidate guidance image 62 as illustrated in, for example, FIG. 7. After that, the game device 10 renders the cursor 60 over the field-of-view image rendered in the VRAM. At this time, a rendering position of the cursor 60 is identified based on the game situation information stored in the main memory 26 (game situation information storage unit 70).

The image (game screen 18a) generated in the VRAM as described above is displayed on the monitor 18 at a given timing.

Here, description is given of the reason for not setting the movement target position candidate 64 in the block 82 that does not satisfy the above-mentioned condition B in Step S105.

Figure 17:
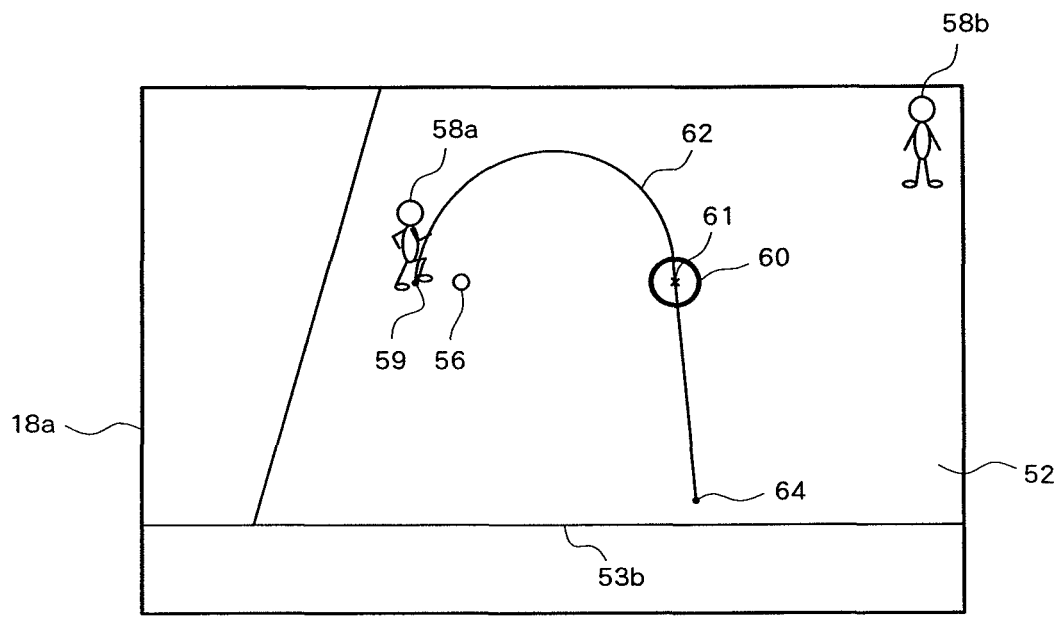
FIG. 17 is a diagram for describing a decision of a movement target position candidate.

The line 88 indicated as the movement target position candidate guidance image 62 is acquired as described above (see Step S106), and hence the setting of the movement target position candidate 64 in the block 82 that does not satisfy the above-mentioned condition B causes the game screen 18a as illustrated in, for example, FIG. 17 to be displayed. That is, the movement target position candidate guidance image 62, in which the degree of curvature (convex) of the line portion extending from the foot position 59 of the player object 58a toward the display position (center position 61) of the cursor 60 is too large, is displayed. If the movement target position candidate guidance image 62 as illustrated in FIG. 17 is displayed, an unnatural impression is given to the user, which in turn impairs the entertainment of the game. In this respect, the game device 10 makes it possible to prevent the occurrence of such an inconvenience because the movement target position candidate 64 is not set in the block 82 that does not satisfy the above-mentioned condition B.

Further, the direction 84 from the foot position 59 of the player object 58 of the user's operation subject toward the position 61a on the field object 52 corresponding to the display position (center position 61) of the cursor 60 is a direction toward which the user wishes to move the player object 58 (see FIG. 15). If the user is guided by the movement target position candidate guidance image 62 in a moving direction that is greatly different from their desired moving direction (direction 84), the significance of the movement target position candidate guidance function is impaired. In this respect, the game device 10 makes it possible to prevent the occurrence of such an inconvenience because the movement target position candidate 64 is not set in the block 82 that does not satisfy the above-mentioned condition B.

The game device 10 described above is provided with the movement target position candidate guidance function. According to this function, in the case where the user depresses the guidance button, the guidance to the movement target position candidate 64 (recommended movement target position) of the player object 58 of the user's operation subject is displayed. That is, the guidance to the position (direction) suitable for the movement target position for (moving direction of) the player object 58 of the user's operation subject. In particular, in this embodiment, the curve (movement target position candidate guidance image 62) as illustrated in, for example, FIG. 7 is used to guide the user to the movement target position candidate 64. Therefore, the user can recognize the relationship among the foot position 59 of the player object 58 of the user's operation subject, the center position 61 of the cursor 60, and the movement target position candidate 64 at a glance based on the curved manner of the line portion connecting the foot position 59 of the player object 58 of the user's operation subject and the center position 61 of the cursor 60. For example, in a case where the line portion connecting the foot position 59 of the player object 58 of the user's operation subject and the center position 61 of the cursor 60 has a convex portion toward an upward direction of the screen, the user can recognize at a glance that the movement target position candidate 64 exists toward a downward direction of the screen. Alternatively, for example, in a case where the line portion connecting the foot position 59 of the player object 58 of the user's operation subject and the center position 61 of the cursor 60 has a convex portion toward the downward direction of the screen, the user can recognize at a glance that the movement target position candidate 64 exists toward the upward direction of the screen. Alternatively, for example, in a case where the line portion connecting the foot position 59 of the player object 58 of the user's operation subject and the center position 61 of the cursor 60 is a straight line, the user can recognize at a glance that the movement target position candidate 64 exists toward a moving direction of the player object 58 of user's operation subject. As a result, the user can recognize the recommended movement target position (moving direction) at a glance.

Note that the present invention is not limited to the embodiment described above.

Figure 18:
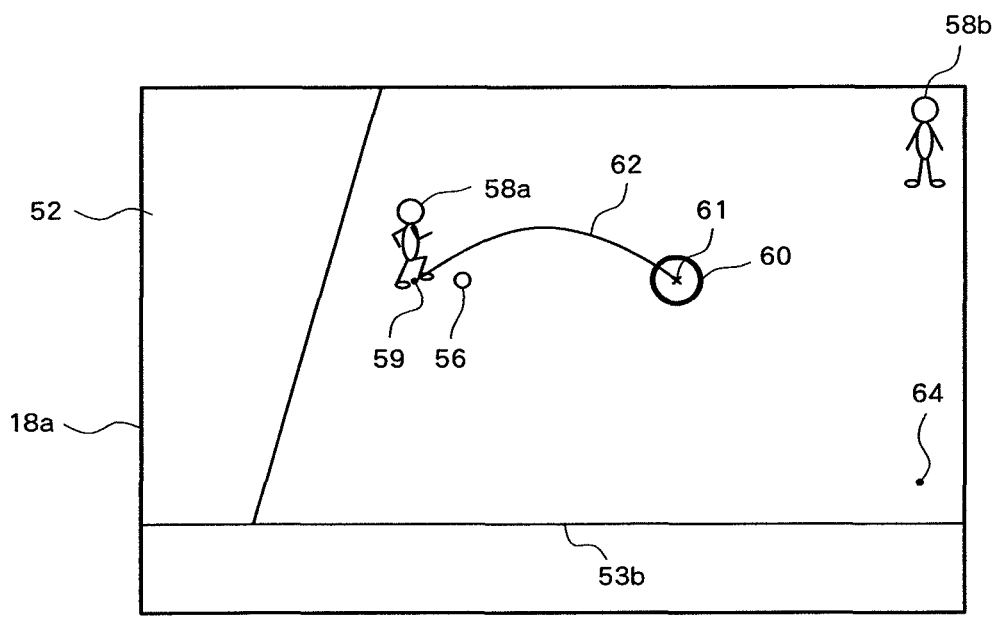
FIG. 18 is a diagram illustrating an example of a game screen.

For example, the movement target position candidate guidance image 62 may be an image representing only the line portion connecting the foot position 59 of the player object 58 of the user's operation subject and the center position 61 of the cursor 60. That is, a line portion connecting the center position 61 of the cursor 60 and the movement target position candidate 64 may be kept from being displayed on the game screen 18a. FIG. 18 illustrates an example of the game screen 18a in that case. Note that in this case, the movement target position candidate 64 may be displayed on the game screen 18a, or the movement target position candidate 64 may be kept from being displayed on the game screen 18a.

Figure 19:
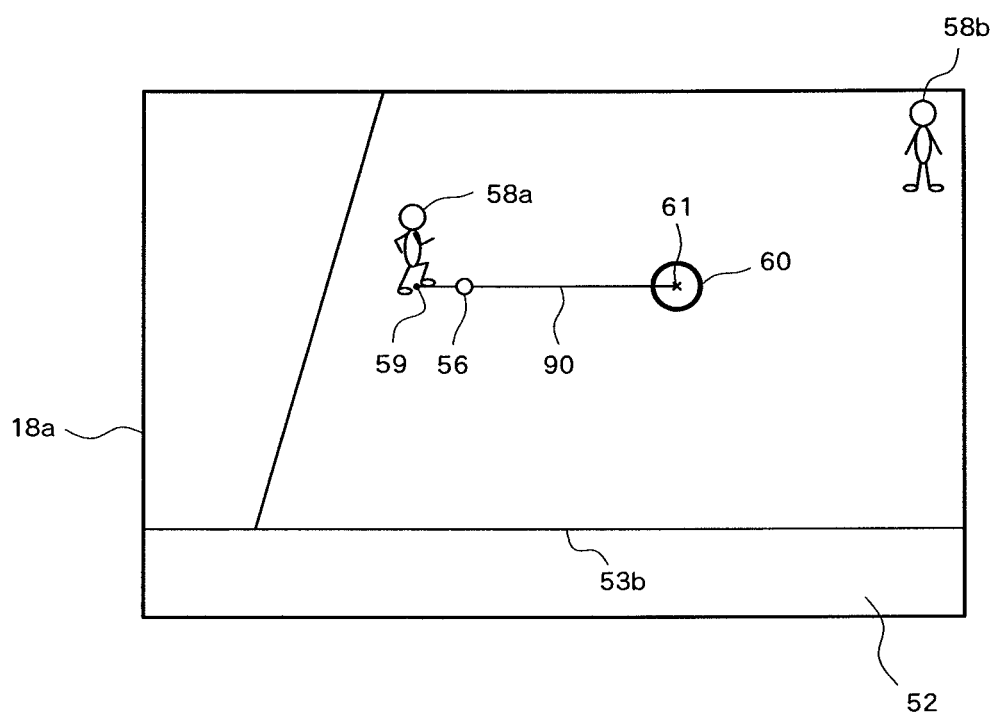
FIG. 19 is a diagram illustrating an example of the game screen.

Further, for example, while the game screen 18a illustrated in FIG. 6 is being displayed, if the user causes the cursor 60 to move while keeping a predetermined button (for example, button 46c) depressed, a line connecting the foot position 59 of the player object 58a and the center position 61 of the cursor 60 may be displayed. FIG. 19 illustrates an example of the game screen 18a in that case. As illustrated in FIG. 19, a line 90 connecting the foot position 59 of the player object 58a and the center position 61 of the cursor 60 may be displayed. In this manner, the player object 58a may be caused to move as if to be dragged by the line 90. Accordingly, it becomes possible for the user to recognize a positional relationship between the position of the player object 58a and the position of the cursor 60 at a glance. Further, it becomes possible for the user to recognize the moving direction and the kicking direction of the player object 58a at a glance.

Note that if the guidance button is depressed while the game screen 18a illustrated in FIG. 19 is being displayed, that is, if the guidance button is depressed with the predetermined button (for example, button 46c) being kept depressed, the curved manner of the line 90 may be set to vary based on a positional relationship between the position 61a on the field object 52 corresponding to the display position (center position 61) of the cursor 60 and the movement target position candidate 64. That is, if the guidance button is depressed while the game screen 18a illustrated in FIG. 19 is being displayed, the game screen 18a as illustrated in, for example, FIG. 18 may be displayed.

Further, for example, the moving speed of the player object 58a may be set to vary according to a distance between the position of the player object 58a and the position of the cursor 60. Here, the distance between the position of the player object 58a and the position of the cursor 60 may represent a distance in terms of the screen coordinate system, or may represent a distance in terms of the virtual three-dimensional space 50. For example, on the game screen 18a illustrated in FIG. 19, the moving speed of the player object 58a may be set to vary according to a length of the line 90. In that case, the game device 10 stores information associating the length of the line 90 with the moving speed of the player object 58a. The information may be information in a table format, or may be an arithmetic expression. Then, the moving speed corresponding to the length of the line 90 is acquired based on the above-mentioned information, and the player object 58a moves at the moving speed. In such manner as described above, the moving speed of the player object 58a may be increased, for example, as the distance between the position of the player object 58a and the position of the cursor 60 becomes larger. Accordingly, it becomes possible for the user to adjust the moving speed of the player object 58a by adjusting the length of the line 90 (distance between the position of the player object 58a and the position of the cursor 60).

Further, for example, the reference angle θc included in the above-mentioned condition B may be set to vary based on a distance between the foot position 59 of the player object 58 of the user's operation subject and the position 61a on the field object 52 corresponding to the display position (center position 61) of the cursor 60. In this case, information associating a distance range i with an angle is stored in the game device 10. The information may be information in a table format, or may be an arithmetic expression. Then, an angle to which the distance between the foot position 59 of the player object 58 of the user's operation subject and the position 61a belongs is acquired based on the above-mentioned information, and the angle is used as the reference angle θc included in the above-mentioned condition B.

In this case, it is preferable to set the reference angle θc to become smaller as the distance between the foot position 59 of the player object 58 of the user's operation subject and the position 61a becomes smaller. In a case where the distance is relatively small, the degree of curvature (convex) of the line portion extending from the foot position 59 of the player object 58 of the user's operation subject toward the center position 61 of the cursor 60 is larger than in a case where the distance is relatively large. Therefore, in the case where the distance is relatively small, by setting the reference angle θc included in the above-mentioned condition B to become smaller, it is possible to prevent the displaying of the movement target position candidate guidance image 62 in which the degree of curvature (convex) of the line portion extending from the foot position 59 of the player object 58 of the user's operation subject toward the center position 61 of the cursor 60 is too large.

Further, for example, the line acquisition unit 76 may acquire a curve connecting the display position of the player object 58 of the user's operation subject on the game screen 18a (screen coordinate value corresponding to the foot position 59 of the player object 58 of the user's operation subject), the display position (screen coordinate value of the center position 61) of the cursor 60, and the screen coordinate value corresponding to the movement target position candidate 64. Note that the screen coordinate value corresponding to the movement target position candidate 64 is acquired by transforming the movement target position candidate 64 into a screen coordinate value by using the same matrix calculation as is used for generating the field-of-view image showing the state of the virtual three-dimensional space 50 viewed from the virtual camera 57 (S107 of FIG. 9). Note that in this case, in S107 of FIG. 9, after the field-of-view image showing the state of the virtual three-dimensional space 50 viewed from the virtual camera 57 is rendered in the VRAM, an image representing the curve acquired by the line acquisition unit 76 is rendered over the field-of-view image. Further, in this case, the reference angle θc included in the above-mentioned condition B may be set to vary based on the distance between the display position of the player object 58 of the user's operation subject on the game screen 18*a* and the display position of the cursor 60.

Further, for example, the movement target position candidate guidance image 62 may be displayed only in a case where the guidance button is kept depressed while the player object 58 of the user's operation subject is keeping the ball object 56.

In this case, the line acquisition unit 76 may acquire the line based on not the position of the player object 58 of the user's operation subject but the position of the ball object 56 (mobile character). That is, the line acquisition unit 76 may acquire a curve connecting the position of the ball object 56 in the virtual three-dimensional space 50, the position 61*a* on the field object 52 corresponding to the display position (center position 61) of the cursor 60, and the movement target position candidate 64 decided by the movement target position candidate decision unit 74. In this case, the reference angle θc included in the above-mentioned condition B may be set to vary based on the distance between the position of the ball object 56 and the position 61*a* on the field object 52 corresponding to the display position (center position 61) of the cursor 60.

Alternatively, the line acquisition unit 76 may acquire a curve connecting the display position (screen coordinate value) of the ball object 56 on the game screen 18*a*, the display position (screen coordinate value of the center position 61) of the cursor 60, and the screen coordinate value corresponding to the movement target position candidate 64. In this case, the reference angle θc included in the above-mentioned condition B may be set to vary based on the distance between the display position of the ball object 56 on the game screen 18*a* and the display position of the cursor 60.

Further, for example, the movement target position candidate decision unit 74 may select a position within a region in which one or more the player objects 58 belonging to the opposing team and having low defense ability is located, as the movement target position candidate 64. In this case, it is judged whether or not the player object 58 has low defense ability based on the defense ability parameter of each player object 58 stored in the optical disk 25 (game situation information storage unit 70).

Further, for example, the movement target position candidate decision unit 74 may decide the position of the goal object 54 associated with the opposing team as the movement target position candidate 64.

Further, for example, the display control unit 78 may cause a display style of the line (movement target position candidate guidance image 62) acquired by the line acquisition unit 76 to vary based on the movement target position candidate 64 and the position of the player object 58 of the opposing team. This allows the user to recognize a relationship between the movement target position candidate 64 and the position of the player object 58 of the opposing team at a glance based on the display style of the line expressed as the movement target position candidate guidance image 62. Note that the display style of the line is, for example, a color, a thickness, a type (solid line, dotted line, or broken line), or the like of the line.

More specifically, the display control unit 78 stores the distance range and display style information indicating the display style of the line in association with each other. Further, the display control unit 78 acquires the distance from the movement target position candidate 64 toward the player object 58 of the opposing team existing nearest to the movement target position candidate 64. Then, the display control unit 78 displays on the game screen 18*a* the movement target position candidate guidance image 62 in which the line acquired by the line acquisition unit 76 is expressed in the display style indicated by the display style information associated with the distance range to which the above-mentioned acquired distance belongs. This allows the user to recognize the distance from the movement target position candidate 64 toward the player object 58 of the opposing team existing nearest to the movement target position candidate 64 at a glance based on the display style of the line expressed as the movement target position candidate guidance image 62.

Alternatively, the display control unit 78 stores a defense ability parameter condition related to a value of the defense ability parameter and the display style information indicating the display style of the line in association with each other. Further, the display control unit 78 selects at least one of the player objects 58 of the opposing team based on the distance between the movement target position candidate 64 and the position of each of the player objects 58 of the opposing team. For example, the display control unit 78 selects the player object 58 of the opposing team existing nearest to the movement target position candidate 64. Then, the display control unit 78 judges whether or not the defense ability parameter condition associated with each item of the display style information is satisfied by the value of the defense ability parameter of the selected player object 58. Further, for example, the display control unit 78 selects the player object 58 of the opposing team located within a predetermined distance from the movement target position candidate 64. Then, the display control unit 78 judges whether or not the defense ability parameter condition associated with each item of the display style information is satisfied by a statistical value (such as a mean value, a maximum value, or a minimum value) of the defense ability parameters of the selected player object 58. If it is judged that the defense ability parameter condition is satisfied, the display control unit 78 displays on the game screen 18*a* the movement target position candidate guidance image 62 in which the line acquired by the line acquisition unit 76 is expressed in the display style indicated by the display style information associated with the defense ability parameter condition. This allows the user to recognize the level of the defense ability of the player object 58 of the opposing team existing in the vicinity of the movement target position candidate 64 at a glance based on the display style of the line expressed as the movement target position candidate guidance image 62.

Further, for example, the game executed on the game device 10 is not limited to the game in which the state of a three-dimensional game space constituted of three coordinate elements is displayed on the game screen 18*a*, but may be a game in which the state of a two-dimensional game space constituted of two coordinate elements is displayed on the game screen 18*a*. That is, the game executed on the game device 10 may be a game in which the positions and the like of a ball character and player characters are managed by the two coordinate elements.

Further, for example, the game executed on the game device 10 may be a game played by two or more users. Further, for example, the game executed on the game device 10 is not limited to the soccer game. The game executed on the game device 10 may be a sports game other than the soccer game. The game executed on the game device 10 may be a game other than a sports game.

Further, for example, the operation input unit 31 may be a touch panel. Further, for example, the operation input unit 31 may be a mouse.

Figure 20:
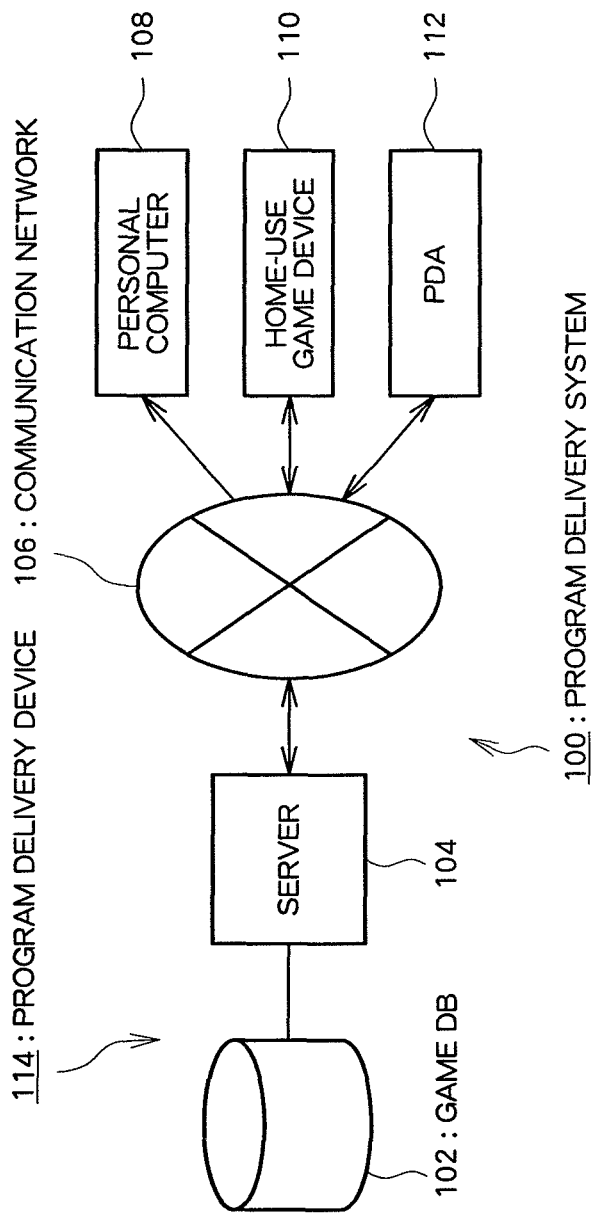
FIG. 20 is a diagram illustrating an overall configuration of a program delivery system according to another embodiment of the present invention.

Further, for example, in the above-mentioned description, the program is supplied from the optical disk 25 serving as an information storage medium to the home-use game device 11, but the program may be delivered to a household or the like via a communication network. FIG. 20 is a diagram illustrating an overall configuration of a program delivery system using the communication network. Based on FIG. 20, description is given of a program delivery method according to the present invention. As illustrated in FIG. 20, the program delivery system 100 includes a game database 102, a server 104, a communication network 106, a personal computer 108, a home-use game device 110, and a personal digital assistant (PDA) 112. Of those, the game database 102 and the server 104 constitute a program delivery device 114. The communication network 106 includes, for example, the Internet and a cable television network. In this system, the same program as storage contents of the optical disk 25 is stored in the game database (information storage medium) 102. A demander uses the personal computer 108, the home-use game device 110, or the PDA 112 to make a game delivery request, and hence the game delivery request is transferred to the server 104 via the communication network 106. Then, the server 104 reads the program from the game database 102 according to the game delivery request, and transmits the program to a game delivery request source such as the personal computer 108, the home-use game device 110, and the PDA 112. Here, the game delivery is performed according to the game delivery request, but the server 104 may transmit the program one way. In addition, all of programs necessary to implement the game are not necessarily delivered at one time (delivered collectively), and necessary parts may be delivered depending on which phase the game is in (split and delivered). By thus performing the game delivery via the communication network 106, the demander can obtain the program with ease.

The invention claimed is:

1. A game device, which displays a game screen showing a mobile character moving toward a position designated by a user, comprising:
    designation position acquisition means for acquiring the position designated by the user;
    movement target position candidate decision means for deciding a movement target position candidate for the mobile character;
    line acquisition means for acquiring a line connecting a position of the mobile character, the position acquired by the designation position acquisition means, and the movement target position candidate; and
    display control means for displaying at least a part of the line acquired by the line acquisition means on the game screen,
    wherein the line acquisition means controls a curved manner of the line connecting the position of the mobile character, the position acquired by the designation position acquisition means, and the movement target position candidate based on a positional relationship between the position acquired by the designation position acquisition means and the movement target position candidate,
    wherein, on the line acquired by the line acquisition means, the position designated by the user is between the position of the mobile character and the movement target position candidate.

2. A game device, which displays a game screen showing a mobile character moving toward a position designated by a user, comprising:
    designation position acquisition means for acquiring the position designated by the user;
    movement target position candidate decision means for deciding a movement target position candidate for the mobile character;
    line acquisition means for acquiring a line connecting a position of the mobile character and the position acquired by the designation position acquisition means; and
    display control means for displaying at least a part of the line acquired by the line acquisition means on the game screen,
    wherein the line acquisition means controls a curved manner of the line connecting the position of the mobile character and the position acquired by the designation position acquisition means based on a positional relationship between the position acquired by the designation position acquisition means and the movement target position candidate decided by the movement target position candidate decision means, and
    wherein the movement target position candidate decision means decides the movement target position candidate so that an angle between a direction from the position of the mobile character toward the position acquired by the designation position acquisition means, and a direction from the position acquired by the designation position acquisition means toward the movement target position candidate, is equal to or less than a reference angle.

3. A game device according to claim 2, wherein the movement target position candidate decision means includes means for setting the reference angle based on a distance between the position of the mobile character and the position acquired by the designation position acquisition means.

4. A game device according to claim 1, wherein:
    a state of a game space in which the mobile character and a rival character competing against the mobile character are located is displayed on the game screen; and
    the display control means includes means for controlling a display style of the line acquired by the line acquisition means based on the movement target position candidate decided by the movement target position candidate decision means and a position of the rival character.

5. A game device, which displays a game screen showing a mobile character moving toward a position designated by a user, comprising:
    designation position acquisition means for acquiring the position designated by the user;
    movement target position candidate decision means for deciding a movement target position candidate for the mobile character;
    line acquisition means for acquiring a line connecting a position of the mobile character and the position acquired by the designation position acquisition means; and
    display control means for displaying at least a part of the line acquired by the line acquisition means on the game screen,
    wherein the line acquisition means controls a curved manner of the line connecting the position of the mobile character and the position acquired by the designation position acquisition means based on a positional relationship between the position acquired by the designation position acquisition means and the movement target position candidate decided by the movement target position candidate decision means,
    wherein
    a state of a game space in which the mobile character and a rival character competing against the mobile character are located is displayed on the game screen;
    the display control means includes means for controlling a display style of the line acquired by the line acquisition means based on the movement target position candidate decided by the movement target position candidate decision means and a position of the rival character; and
wherein the display control means includes:
means for acquiring stored content of means for storing a distance range and display style information related to the display style of the line acquired by the line acquisition means in association with each other;
means for acquiring a distance between the movement target position candidate decided by the movement target position candidate decision means and the position of the rival character; and
means for controlling the display style of the line acquired by the line acquisition means based on the display style information associated with the distance range to which the distance between the movement target position candidate decided by the movement target position candidate decision means and the position of the rival character belongs.

6. A game device according to claim 4, wherein:
a plurality of the rival characters are located in the game space; and
the display control means includes:
means for storing a parameter condition related to a predetermined parameter of the rival character and display style information related to the display style of the line acquired by the line acquisition means in association with each other;
selection means for selecting at least one of the plurality of rival characters based on the movement target position candidate decided by the movement target position candidate decision means and a position of each of the plurality of rival characters;
means for judging whether or not the parameter condition associated with the display style information is satisfied by the predetermined parameter of the rival character selected by the selection means; and
means for controlling, if the parameter condition is satisfied by the predetermined parameter of the rival character selected by the selection means, the display style of the line acquired by the line acquisition means based on the display style information associated with the parameter condition.

7. A control method for a game device which displays a game screen showing a mobile character moving toward a position designated by a user, comprising:
acquiring the position designated by the user;
deciding a movement target position candidate for the mobile character;
acquiring, by one or more processors, a line connecting a position of the mobile character, the acquired position designated by a user, and the decided movement target position candidate; and
displaying at least a part of the acquired line on the game screen,
wherein the acquiring the line includes controlling a curved manner of the line connecting the position of the mobile character, the acquired position designated by a user, and the decided movement target position candidate based on a positional relationship between the acquired position designated by a user and the decided movement target position candidate,
wherein, on the acquired line, the acquired position designated by the user is between the position of the mobile character and the decided movement target position candidate.

8. A computer-readable memory having stored thereon a program causing a computer to function as a game device which displays a game screen showing a mobile character moving toward a position designated by a user, the program causing the computer to perform a method comprising:
acquiring the position designated by the user;
deciding a movement target position candidate for the mobile character;
acquiring a line connecting a position of the mobile character, the acquired position designated by a user, and the decided movement target position candidate; and
displaying at least a part of the acquired line on the game screen,
wherein a curved manner of the line connecting the position of the mobile character, the acquired position designated by a user, and the decided movement target position candidate is controlled based on a positional relationship between the acquired position designated by a user and the decided movement target position candidate,
wherein, on the acquired line, the acquired position designated by the user is between the position of the mobile character and the decided movement target position candidate.

9. A game device, which displays a game screen showing a mobile character moving toward a position designated by a user, comprising:
designation position acquisition means for acquiring the position designated by the user;
movement target position candidate decision means for deciding a movement target position candidate for the mobile character;
line acquisition means for acquiring a curve connecting a position of the mobile character, the position acquired by the designation position acquisition means, and the movement target position candidate decided by the movement target position candidate decision means; and
display control means for displaying at least a part of the curve acquired by the line acquisition means on the game screen,
wherein, on the curve acquired by the line acquisition means, the position designated by the user is between the position of the mobile character and the movement target position candidate.

10. A game device according to claim 2, wherein:
a state of a game space in which the mobile character and a rival character competing against the mobile character are located is displayed on the game screen; and
the display control means includes means for controlling a display style of the line acquired by the line acquisition means based on the movement target position candidate decided by the movement target position candidate decision means and a position of the rival character.

11. A game device according to claim 3, wherein:
a state of a game space in which the mobile character and a rival character competing against the mobile character are located is displayed on the game screen; and
the display control means includes means for controlling a display style of the line acquired by the line acquisition means based on the movement target position candidate decided by the movement target position candidate decision means and a position of the rival character.

12. A game device according to claim 10, wherein the display control means includes:
means for storing a distance range and display style information related to the display style of the line acquired by the line acquisition means in association with each other;

means for acquiring a distance between the movement target position candidate decided by the movement target position candidate decision means and the position of the rival character; and means for controlling the display style of the line acquired by the line acquisition means based on the display style information associated with the distance range to which the distance between the movement target position candidate decided by the movement target position candidate decision means and the position of the rival character belongs.

13. A game device according to claim 11 wherein the display control means includes:

means for storing a distance range and display style information related to the display style of the line acquired by the line acquisition means in association with each other;

means for acquiring a distance between the movement target position candidate decided by the movement target position candidate decision means and the position of the rival character; and means for controlling the display style of the line acquired by the line acquisition means based on the display style information associated with the distance range to which the distance between the movement target position candidate decided by the movement target position candidate decision means and the position of the rival character belongs.

14. A game device according to claim 10, wherein:

a plurality of the rival characters are located in the game space; and the display control means includes:

means for storing a parameter condition related to a predetermined parameter of the rival character and display style information related to the display style of the line acquired by the line acquisition means in association with each other;

selection means for selecting at least one of the plurality of rival characters based on the movement target position candidate decided by the movement target position candidate decision means and a position of each of the plurality of rival characters;

means for judging whether or not the parameter condition associated with the display style information is satisfied by the predetermined parameter of the rival character selected by the selection means; and means for controlling, if the parameter condition is satisfied by the predetermined parameter of the rival character selected by the selection means, the display style of the line acquired by the line acquisition means based on the display style information associated with the parameter condition.

15. A game device according to claim 11, wherein:

a plurality of the rival characters are located in the game space; and the display control means includes:

means for storing a parameter condition related to a predetermined parameter of the rival character and display style information related to the display style of the line acquired by the line acquisition means in association with each other;

selection means for selecting at least one of the plurality of rival characters based on the movement target position candidate decided by the movement target position candidate decision means and a position of each of the plurality of rival characters;

means for judging whether or not the parameter condition associated with the display style information is satisfied by the predetermined parameter of the rival character selected by the selection means; and means for controlling, if the parameter condition is satisfied by the predetermined parameter of the rival character selected by the selection means, the display style of the line acquired by the line acquisition means based on the display style information associated with the parameter condition.

16. A game device, which displays a game screen showing a mobile character moving toward a position designated by a user, comprising:

a processor configured to:

acquire the position designated by the user;

decide a movement target position candidate for the mobile character;

acquire a line connecting a position of the mobile character, the acquired position designated by the user, and the movement target position candidate; and display of at least a part of the acquired line on the game screen, wherein the processor controls a curved manner of the line connecting the position of the mobile character, the acquired position designated by the user, and the movement target position candidate based on a positional relationship between the acquired position designated by the user and the decided movement target position candidate, wherein, on the line acquired by the line acquisition means, the position designated by the user is between the position of the mobile character and the decided movement target position candidate.

17. A game device, which displays a game screen showing a mobile character moving toward a position designated by a user, comprising:

a processor configured to:

acquire the position designated by the user;

decide a movement target position candidate for the mobile character;

acquire a curve connecting a position of the mobile character, the acquired position designated by the user, and the decided movement target position candidate; and display at least a part of the acquired curve on the game screen, wherein, on the acquired curve, the acquired position designated by the user is between the position of the mobile character and the movement target position candidate.

18. A game device according to claim 1, wherein the movement target position candidate decision means decides the movement target position candidate based on a position of a rival character competing against the mobile character.

19. A game device according to claim 18, wherein the movement target position candidate decision means decides a position around which no rival character is located as the movement target position candidate.

20. A game device according to claim 18, wherein the movement target position candidate decision means decides, as the movement target position candidate, a position that is reachable by the mobile character earlier than by the rival character.

21. A control method for a game device which displays a game screen showing a mobile character moving toward a position designated by a user, comprising:

acquiring the position designated by the user;

deciding a movement target position candidate for the mobile character;

acquiring, by one or more processors, a line connecting a position of the mobile character and the acquired position designated by a user; and displaying at least a part of the acquired line on the game screen, wherein the acquiring the line includes controlling a curved manner of the acquired line connecting the position of the mobile character and the acquired position designated by a user based on a positional relationship between the acquired position designated by a user and the decided movement target position candidate, and wherein the movement target position candidate is decided so that an angle between a direction from the position of the mobile character toward the acquired position designated by a user, and a direction from the acquired position designated by a user toward the movement target position candidate, is equal to or less than a reference angle.

22. A computer-readable memory having stored thereon a program causing a computer to function as a game device which displays a game screen showing a mobile character moving toward a position designated by a user, the program causing the computer to perform a method comprising:

acquiring the position designated by the user;

deciding a movement target position candidate for the mobile character;

acquiring a line connecting a position of the mobile character and the acquired position designated by a user; and displaying at least a part of the acquired line on the game screen, wherein a curved manner of the line connecting the position of the mobile character and the acquired position designated by a user is controlled based on a positional relationship between the acquired position designated by a user and the decided movement target position candidate, and wherein the movement target position candidate is decided so that an angle between a direction from the position of the mobile character toward the acquired position designated by a user, and a direction from the acquired position designated by a user toward the movement target position candidate, is equal to or less than a reference angle.

23. A control method for a game device which displays a game screen showing a mobile character moving toward a position designated by a user, comprising:

acquiring the position designated by the user;

deciding a movement target position candidate for the mobile character;

acquiring, by one or more processors, a line connecting a position of the mobile character and the acquired position designated by a user; and displaying at least a part of the acquired line on the game screen, wherein the acquiring the line includes controlling a curved manner of the acquired line connecting the position of the mobile character and the acquired position designated by a user based on a positional relationship between the acquired position designated by a user and the decided movement target position candidate, and wherein a state of a game space in which the mobile character and a rival character competing against the mobile character are located is displayed on the game screen;

the displaying includes controlling a display style of the acquired line based on the movement target position candidate and a position of the rival character; and the displaying includes:

acquiring stored content of a storage that stores a distance range and display style information related to the display style of the line in association with each other;

acquiring a distance between the movement target position candidate and the position of the rival character; and controlling the display style of the acquired line based on the display style information associated with the distance range to which the distance between the movement target position candidate and the position of the rival character belongs.

24. A computer-readable memory having stored thereon a program causing a computer to function as a game device which displays a game screen showing a mobile character moving toward a position designated by a user, the program causing the computer to perform a method comprising:

acquiring the position designated by the user;

deciding a movement target position candidate for the mobile character;

acquiring a line connecting a position of the mobile character and the acquired position designated by a user; and displaying at least a part of the acquired line on the game screen, wherein a curved manner of the line connecting the position of the mobile character and the acquired position designated by a user is controlled based on a positional relationship between the acquired position designated by a user and the decided movement target position candidate, and wherein a state of a game space in which the mobile character and a rival character competing against the mobile character are located is displayed on the game screen;

the displaying includes controlling a display style of the acquired line based on the movement target position candidate and a position of the rival character; and the displaying includes:

acquiring stored content of a storage that stores a distance range and display style information related to the display style of the line in association with each other;

acquiring a distance between the movement target position candidate and the position of the rival character; and controlling the display style of the acquired line based on the display style information associated with the distance range to which the distance between the movement target position candidate and the position of the rival character belongs.

\* \* \* \* \*